US009829984B2

(12) United States Patent
Dai et al.

(10) Patent No.: US 9,829,984 B2
(45) Date of Patent: Nov. 28, 2017

(54) MOTION-ASSISTED VISUAL LANGUAGE FOR HUMAN COMPUTER INTERFACES

(71) Applicant: FastVDO LLC, Cocoa Beach, FL (US)

(72) Inventors: Wei Dai, Clarksville, MD (US); Madhu Peringassery Krishnan, Columbia, MD (US); Pankaj Topiwala, Cocoa Beach, FL (US)

(73) Assignee: FastVDO LLC, Cocoa Beach, FL (US)

( * ) Notice: Subject to any disclaimer, the term of this patent is extended or adjusted under 35 U.S.C. 154(b) by 0 days.

(21) Appl. No.: 14/085,591

(22) Filed: Nov. 20, 2013

(65) Prior Publication Data
US 2014/0347263 A1 Nov. 27, 2014

Related U.S. Application Data

(60) Provisional application No. 61/826,914, filed on May 23, 2013.

(51) Int. Cl.
G09G 5/00 (2006.01)
G06F 3/01 (2006.01)
(Continued)

(52) U.S. Cl.
CPC ............ G06F 3/017 (2013.01); G06F 3/0482 (2013.01); G06F 3/04842 (2013.01); G06K 9/00355 (2013.01)

(58) Field of Classification Search
CPC .... G06F 3/017; G06F 3/0482; G06F 3/04842; G06T 7/0051–7/0077; G06T 2207/10028; G06K 9/00355
See application file for complete search history.

(56) References Cited

U.S. PATENT DOCUMENTS

| 4,843,568 A | 6/1989 | Krueger et al. |
| 5,454,043 A | 9/1995 | Freeman |

(Continued)

FOREIGN PATENT DOCUMENTS

| WO | WO 2007/097548 A1 | 8/2007 |
| WO | WO 2009/003071 A1 | 12/2008 |

(Continued)

OTHER PUBLICATIONS

PCT International Search Report and Written Opinion, PCT Application No. PCT/US14/37251, dated Sep. 19, 2014, 21 pages.
(Continued)

*Primary Examiner* — Amare Mengistu
*Assistant Examiner* — Crystal A Mathews
(74) *Attorney, Agent, or Firm* — Fenwick & West LLP

(57) ABSTRACT

Embodiments of the invention recognize human visual gestures, as captured by image and video sensors, to develop a visual language for a variety of human computer interfaces. One embodiment of the invention provides a computer-implement method for recognizing a visual gesture portrayed by a part of human body such as a human hand, face or body. The method includes steps of receiving the visual signature captured in a video having multiple video frames, determining a gesture recognition type from multiple gesture recognition types including shaped-based gesture, position-based gesture, motion-assisted and mixed gesture that combining two different gesture types. The method further includes steps of selecting a visual gesture recognition process based on the determined gesture type and applying the selected visual gesture recognition process to the multiple video frames capturing the visual gesture to recognize the visual gesture.

104 Claims, 16 Drawing Sheets

(51) Int. Cl.
*G06F 3/0482* (2013.01)
*G06F 3/0484* (2013.01)
*G06K 9/00* (2006.01)

(56) References Cited

U.S. PATENT DOCUMENTS

| | | | |
|---|---|---|---|
| 5,581,276 A | 12/1996 | Cipolla et al. | |
| 5,594,469 A | 1/1997 | Freeman et al. | |
| 5,982,352 A | 11/1999 | Pryor | |
| 6,002,808 A | 12/1999 | Freeman | |
| 6,072,494 A | 6/2000 | Nguyen | |
| 6,075,895 A | 6/2000 | Qiao et al. | |
| 6,191,773 B1 | 2/2001 | Maruno et al. | |
| 6,215,890 B1 | 4/2001 | Matsuo et al. | |
| 6,222,465 B1 | 4/2001 | Kumar et al. | |
| 6,256,033 B1 | 7/2001 | Nguyen | |
| 6,385,331 B2 | 5/2002 | Harakawa et al. | |
| 6,501,515 B1 | 12/2002 | Iwamura | |
| 7,034,807 B2 | 4/2006 | Maggioni | |
| 7,042,440 B2 | 5/2006 | Pryor et al. | |
| 7,058,204 B2 | 6/2006 | Hildreth et al. | |
| 7,109,970 B1 | 9/2006 | Miller | |
| 7,129,927 B2 | 10/2006 | Mattsson | |
| 7,142,600 B1* | 11/2006 | Schonfeld | G06T 7/2006 375/240.16 |
| 7,170,492 B2 | 1/2007 | Bell | |
| 7,227,526 B2 | 6/2007 | Hildreth et al. | |
| 7,259,747 B2 | 8/2007 | Bell | |
| 7,340,077 B2 | 3/2008 | Gokturk et al. | |
| 7,348,963 B2 | 3/2008 | Bell | |
| 7,379,563 B2 | 5/2008 | Shamaie | |
| 7,379,566 B2 | 5/2008 | Hildreth | |
| 7,389,591 B2 | 6/2008 | Jaiswal et al. | |
| 7,421,093 B2 | 9/2008 | Hildreth et al. | |
| 7,428,542 B1 | 9/2008 | Fink et al. | |
| 7,430,312 B2 | 9/2008 | Gu | |
| 7,606,411 B2* | 10/2009 | Venetsky et al. | 382/153 |
| 7,684,592 B2* | 3/2010 | Paul | G06F 3/017 382/103 |
| 8,107,599 B2 | 1/2012 | Topiwala et al. | |
| 8,428,135 B2 | 4/2013 | Tourapis et al. | |
| 8,520,736 B2 | 8/2013 | Topiwala | |
| 8,971,572 B1* | 3/2015 | Yin | G06K 9/00355 345/173 |
| 2002/0057383 A1* | 5/2002 | Iwamura | 348/734 |
| 2002/0064382 A1* | 5/2002 | Hildreth | G06K 9/00375 396/100 |
| 2002/0186200 A1 | 12/2002 | Green | |
| 2002/0186221 A1 | 12/2002 | Bell | |
| 2003/0138130 A1* | 7/2003 | Cohen et al. | 382/103 |
| 2004/0120581 A1* | 6/2004 | Ozer | G06K 9/00335 382/224 |
| 2004/0125076 A1 | 7/2004 | Green | |
| 2004/0183775 A1 | 9/2004 | Bell | |
| 2004/0193413 A1 | 9/2004 | Wilson et al. | |
| 2005/0006154 A1 | 1/2005 | Back et al. | |
| 2005/0063564 A1* | 3/2005 | Yamamoto | B60R 25/2045 382/104 |
| 2005/0271279 A1* | 12/2005 | Fujimura et al. | 382/203 |
| 2006/0098873 A1 | 5/2006 | Hildreth et al. | |
| 2006/0245497 A1 | 11/2006 | Tourapis et al. | |
| 2006/0281453 A1 | 12/2006 | Jaiswal et al. | |
| 2006/0284837 A1* | 12/2006 | Stenger et al. | 345/156 |
| 2007/0058717 A1* | 3/2007 | Chosak | G06K 9/32 375/240.08 |
| 2007/0127577 A1 | 6/2007 | Tourapis et al. | |
| 2008/0018595 A1 | 1/2008 | Hildreth et al. | |
| 2008/0030460 A1 | 2/2008 | Hildreth et al. | |
| 2008/0056536 A1 | 3/2008 | Hildreth et al. | |
| 2008/0062123 A1 | 3/2008 | Bell | |
| 2008/0089587 A1* | 4/2008 | Kim | G06F 3/017 382/190 |
| 2008/0137913 A1 | 6/2008 | Hildreth | |
| 2008/0141181 A1* | 6/2008 | Ishigaki et al. | 715/863 |
| 2008/0152191 A1* | 6/2008 | Fujimura | G06K 9/00214 382/103 |
| 2008/0166022 A1 | 7/2008 | Hildreth | |
| 2008/0187178 A1 | 8/2008 | Shamaie | |
| 2008/0199071 A1 | 8/2008 | Gu | |
| 2008/0205701 A1 | 8/2008 | Shamaie et al. | |
| 2008/0208517 A1 | 8/2008 | Shamaie | |
| 2008/0219502 A1 | 9/2008 | Shamaie | |
| 2008/0235965 A1 | 10/2008 | Jaiswal et al. | |
| 2008/0244465 A1* | 10/2008 | Kongqiao et al. | 715/863 |
| 2008/0267447 A1 | 10/2008 | Kelusky et al. | |
| 2008/0273755 A1 | 11/2008 | Hildreth | |
| 2009/0003686 A1 | 1/2009 | Gu | |
| 2009/0027337 A1 | 1/2009 | Hildreth | |
| 2009/0031240 A1 | 1/2009 | Hildreth | |
| 2009/0041340 A1* | 2/2009 | Suzuki | G06K 9/00288 382/159 |
| 2009/0051648 A1 | 2/2009 | Shamaie et al. | |
| 2009/0052785 A1 | 2/2009 | Shamaie et al. | |
| 2009/0079813 A1 | 3/2009 | Hildreth | |
| 2009/0103780 A1* | 4/2009 | Nishihara | G06F 3/017 382/103 |
| 2009/0141933 A1* | 6/2009 | Wagg | G06K 9/00348 382/100 |
| 2009/0141982 A1* | 6/2009 | Suzuki | G06K 9/00335 382/190 |
| 2009/0208052 A1* | 8/2009 | Kaplan | G06F 3/011 382/103 |
| 2009/0217211 A1* | 8/2009 | Hildreth et al. | 715/863 |
| 2009/0315740 A1* | 12/2009 | Hildreth | G06F 3/017 341/20 |
| 2010/0050133 A1* | 2/2010 | Nishihara | G06F 3/0425 715/863 |
| 2010/0159981 A1* | 6/2010 | Chiang et al. | 455/556.1 |
| 2010/0199232 A1* | 8/2010 | Mistry et al. | 715/863 |
| 2010/0235034 A1* | 9/2010 | Higgins | G05D 1/0083 701/28 |
| 2010/0290529 A1 | 11/2010 | Topiwala | |
| 2010/0321293 A1* | 12/2010 | Hsiung | 345/158 |
| 2011/0026765 A1* | 2/2011 | Ivanich et al. | 382/103 |
| 2011/0041100 A1* | 2/2011 | Boillot | G06F 3/011 715/863 |
| 2011/0055846 A1* | 3/2011 | Perez | G06F 3/017 719/313 |
| 2011/0102570 A1 | 5/2011 | Wilf et al. | |
| 2011/0129124 A1* | 6/2011 | Givon | G06F 3/011 382/107 |
| 2011/0161852 A1* | 6/2011 | Vainio et al. | 715/769 |
| 2011/0193939 A1* | 8/2011 | Vassigh | G06F 3/011 348/46 |
| 2011/0211754 A1* | 9/2011 | Litvak et al. | 382/165 |
| 2011/0242037 A1 | 10/2011 | Gruber | |
| 2011/0267258 A1* | 11/2011 | Wang | G06F 3/017 345/156 |
| 2011/0268365 A1* | 11/2011 | Lou | G06K 9/00389 382/224 |
| 2011/0293137 A1* | 12/2011 | Gurman | G06K 9/00201 382/103 |
| 2011/0301934 A1* | 12/2011 | Tardif | G06F 3/017 704/1 |
| 2012/0069168 A1* | 3/2012 | Huang | G06F 3/017 348/77 |
| 2012/0087543 A1* | 4/2012 | Choi et al. | 382/103 |
| 2012/0113241 A1* | 5/2012 | Sundaresan | G06F 3/017 348/77 |
| 2012/0119984 A1 | 5/2012 | Sankarasubramaniam | G06F 3/017 345/156 |
| 2012/0200494 A1 | 8/2012 | Perski et al. | |
| 2012/0207345 A1* | 8/2012 | Tang | G06F 3/017 382/103 |
| 2012/0218406 A1* | 8/2012 | Hanina | G06F 3/017 348/143 |
| 2012/0235899 A1* | 9/2012 | Han | G06K 9/00355 345/156 |
| 2012/0235903 A1* | 9/2012 | Im | G06F 3/005 345/158 |

(56) References Cited

U.S. PATENT DOCUMENTS

| | | | |
|---|---|---|---|
| 2012/0266079 A1* | 10/2012 | Lee et al. | 715/744 |
| 2012/0308140 A1* | 12/2012 | Ambrus | G06K 9/00362 |
| | | | 382/190 |
| 2012/0308144 A1* | 12/2012 | Tokunaga | H04N 5/145 |
| | | | 382/206 |
| 2012/0314902 A1* | 12/2012 | Kimura | G06F 3/017 |
| | | | 382/103 |
| 2013/0033483 A1* | 2/2013 | Im | G06F 3/0482 |
| | | | 345/419 |
| 2013/0050458 A1* | 2/2013 | Kim | G06F 3/011 |
| | | | 348/77 |
| 2013/0057469 A1* | 3/2013 | Ajika | G06F 3/017 |
| | | | 345/156 |
| 2013/0100119 A1* | 4/2013 | Evertt | G06K 9/00201 |
| | | | 345/419 |
| 2013/0135199 A1 | 5/2013 | Perski et al. | |
| 2013/0182079 A1* | 7/2013 | Holz | G06T 7/0075 |
| | | | 348/47 |
| 2013/0229499 A1* | 9/2013 | Zhao | G06F 3/0482 |
| | | | 348/51 |
| 2013/0257720 A1* | 10/2013 | Noda | G06F 3/017 |
| | | | 345/157 |
| 2013/0278504 A1* | 10/2013 | Tong | G06F 3/017 |
| | | | 345/158 |
| 2013/0285904 A1 | 10/2013 | Kaplan et al. | |
| 2013/0293460 A1 | 11/2013 | Kaplan et al. | |
| 2013/0307768 A1* | 11/2013 | Kim | G06F 3/011 |
| | | | 345/156 |
| 2014/0010441 A1* | 1/2014 | Shamaie | G06K 9/00355 |
| | | | 382/164 |
| 2014/0049465 A1* | 2/2014 | Tremaine | G06F 3/017 |
| | | | 345/156 |
| 2014/0062866 A1* | 3/2014 | Yamashita | G06K 9/4652 |
| | | | 345/156 |
| 2014/0071042 A1* | 3/2014 | Eilat | G06F 3/017 |
| | | | 345/156 |
| 2014/0089849 A1* | 3/2014 | Choi et al. | 715/810 |
| 2014/0099017 A1* | 4/2014 | Tsai | G06T 7/0081 |
| | | | 382/154 |
| 2014/0126818 A1* | 5/2014 | Wei | G06T 7/2006 |
| | | | 382/171 |
| 2014/0157209 A1* | 6/2014 | Dalal | G06F 3/017 |
| | | | 715/863 |
| 2014/0161309 A1* | 6/2014 | Chiang | G06K 9/00355 |
| | | | 382/103 |
| 2014/0205146 A1* | 7/2014 | Holz | G06T 7/2046 |
| | | | 382/103 |
| 2014/0253429 A1 | 9/2014 | Dai et al. | |
| 2014/0320408 A1* | 10/2014 | Zagorsek | G06F 3/017 |
| | | | 345/158 |
| 2015/0261299 A1* | 9/2015 | Wajs | G06F 3/011 |
| | | | 726/19 |

FOREIGN PATENT DOCUMENTS

| | | |
|---|---|---|
| WO | WO 2009/128064 A2 | 10/2009 |
| WO | WO 2009/128064 A3 | 10/2009 |
| WO | WO 2010/062117 A2 | 6/2010 |
| WO | WO 2011/045789 A1 | 4/2011 |
| WO | WO 2012/020410 A2 | 2/2012 |
| WO | WO 2012/081012 A1 | 6/2012 |
| WO | WO 2012/093394 A2 | 7/2012 |
| WO | WO 2012/164562 A1 | 12/2012 |
| WO | WO 2013/008236 A1 | 1/2013 |
| WO | WO 2013/063767 A1 | 5/2013 |
| WO | WO 2013/124845 A1 | 8/2013 |
| WO | WO 2013/168160 A1 | 11/2013 |

OTHER PUBLICATIONS

Avidan, S., "Support Vector Tracking," IEEE Transactions on Pattern Analysis and Machine Intelligence, Aug. 2004, pp. 1064-1072, vol. 26, No. 8.

Cheong, H. Y., et al., "Fast Motion Estimation within the JVT Codec," ISO/IEC JTC1/SC29/WG11 and ITU-T Q6/SG16, document JVT-E023, Oct. 2002, 15 pages.

Dale, K. et al., "Video Face Replacement," ACM Trans. Graphics (Proc. SIGGRAPH Asia), 2011, 10 pages, vol. 30.

Kalal, Z. et al, "P-N. Learning: Bootstrapping Binary Classifiers by Structural Constraints," 23rd IEEE Conference on Computer Vision and Pattern Recognition, CVPR, Jun. 13-18, 2010, San Francisco, CA, 8 pages.

Kalal, Z. et al., Tracking-Learning-Detection, IEEE Transactions on Pattern Analysis and Machine Intelligence, Jan. 2010, pp. 1-14, vol. 6, No. 1.

Kalal, Z., "Tracking Learning Detection," PhD Thesis, University of Surrey, UK, Sep. 2010, 124 pages.

Kalman, R., "A New Approach to Linear Filtering and Prediction Problems," Transactions of the ASME—Journal of Basic Engineering, 1960, pp. 24-45, vol. 82.

Kumar, B. et al, Correlation Pattern Recognition, Cambridge Univ. Press, 2010. (Cover Page, Title Page and TOC), (not enclosed), May Be Retrieved at <URL: http://www.amazon.com/Correlation-Pattern-Recognition-Vijaya-Kumar/dp/0521571030>.

Lucas, B. et al., "An Iterative Image Registration Technique with an Application to Stereo Vision," Proceedings of Imaging Understanding Workshop, 1981, pp. 121-130.

Maggio, E. et al., Video Tracking: Theory and Practice, Wiley, 2011. (Cover Page, Title Page and TOC) not enclosed), May Be Retrieved at <URL: http://www.amazon.com/Video-Tracking-Practice-Emilio-Maggio/dp/0470749644>.

Nebehay, G., "Robust Object Tracking Based on Tracking-Learning-Detection," MS Thesis, Technical University of Vienna, May 2012, 60 pages.

Theodoridis, S. et al., *Pattern Recognition*, Academic Press, 2008. (Cover Page, Title Page and TOC), 8 pages.

Tourapis, A. M., et al., "Fast ME in the JM Reference Software," ISO/IEC JTC1/SC29/WG11 and ITU-T Q6/SG16, document NT-P026, Jul. 2005, 26 pages.

Viola, P. et al., "Rapid Object Detection Using a Boosted Cascade of Simple Features," Proceedings of the 2001 IEEE Computer Society on Computer Vision and Pattern Recognition, (CVPR '01), IEEE, 2001, 8 pages.

\* cited by examiner

FIG. 16

| FASTVDO TRACKER TEST 1 | | | |
|---|---|---|---|
| | MALT 2D | TLD 2D | |
| NumFrDet | 365 | 336 | |
| NumFrWHand | 382 | 382 | Video_1 |
| DetPerf (%) | 95.55 | 87.96 | |
| Fps: | 18.22 | 14.67 | |
| NumFrDet | 291 | 239 | |
| NumFrWHand | 342 | 342 | |
| DetPerf (%) | 85.09 | 69.88 | |
| Fps: | 19.86 | 15.69 | Video_2 |
| NumFrDet | 262 | 11 | |
| NumFrWHand | 262 | 262 | Video_3 |
| DetPerf (%) | 100 | 4.20 | |
| Fps: | 11.79 | 13.50 | |

FIG. 17

MOTION-ASSISTED VISUAL LANGUAGE FOR HUMAN COMPUTER INTERFACES

CROSS-REFERENCE TO RELATED APPLICATIONS

This application claims the benefit of U.S. Provisional Application No. 61/826,914, filed May 23, 2013, which is incorporated by reference in its entirety.

BACKGROUND

This invention relates generally to visual languages for human computer interfaces, and more specifically to recognizing human visual gestures, as captured by image and video sensors, to develop a visual language for human computer interfaces.

Human Computer Interface (HCI) has been an active research subject with a wide range of approaches, from mice and keyboards, to graphical user interfaces, to current touch screens and emerging gesture recognition interfaces. The recent development of mobile platforms, such as smartphones and tablets, has brought significant innovations in a rapidly developing commercial field, inviting innovative human computer interfaces to enhance user convenience. For example, smartphones and tablets incorporate multiple image/video cameras, and touch screens with multi-touch sensitivity without traditional keyboards, mice and pencil-like entry devices. Recent gaming consoles, TVs, and other consumer devices have added further innovation of incorporating human visual gestures into the systems, e.g., multiple sensors including depth sensors, for a computer to understand human body gestures.

One emerging approach to human computer interface is hand gesture recognition, which is the problem of recognizing pre-defined shapes and figures, positions, and any associated motions, of a human hand. Hand gesture recognition is a subfield of gesture recognition, which is the problem of recognizing pre-defined gestures with the human body. Other subfields of gesture recognition include recognizing gestures of human face and human body. Gesture recognition is a rapidly developing area of pattern recognition, due to emerging applications in many areas, such as consumer electronics and mobile communications. Pattern recognition typically encompasses functions such as object detection, tracking, recognition, and identification, and pattern recognition techniques can be used for applications in human computer interfaces, surveillance, security, and biometric authentication.

There are multiple challenges of existing solutions to human computer interface problems and applications, including limited platform size, limited facilities such as keyboards and screen size, limited computing power, and potentially limited bandwidth in wireless network connectivity. These challenges stress simplicity and convenience of application designs, and put a premium on efficient interfaces. For example, an existing solution recognizes human body shape and motion captured by video sensors without any markings by using multiple sensors including a specialized infrared (IR) depth sensor, but this solution makes the human computer interface solution more complex than desired. Thus, the challenges of existing solutions to human computer interface problems and applications call for an efficient and robust solution that meets the challenges of human computer interface for visual gesture recognition.

SUMMARY

Embodiments of the invention recognize human visual gestures, as captured by image and video sensors, include to develop a visual language for a variety of useful human computer interfaces. The solutions provided by the embodiments of the invention focus on facilitating expressions represented by human visual gestures and execution of commands suitable for modern computer applications. A variety of applications is possible, from scrolling through websites or documents, to making selections in menus, to immersive experiences in virtual reality, to innovative media manipulation, such as media capture, composition, editing, and visualization.

One embodiment of the invention provides a computer-implement method for recognizing a visual gesture portrayed by a part of human body such as a human hand, face (including gestures made by the eyes and/or lips) or body. The method includes steps of receiving the visual signature captured in a video having multiple video frames and applying a visual gesture recognition process selected from multiple visual gesture recognition processes to the multiple video frames to recognize the visual gesture. The visual gesture recognition processes include shape-based gesture recognition process, position-based gesture recognition process, motion-assisted gesture recognition process and mixed gesture recognition process that combines multiple gesture recognition processes.

One embodiment of the computer-implemented method includes steps of applying a shape-based gesture recognition process to the multiple video frames capturing the visual gesture. The steps of the method include selecting a video frame of the multiple video frames of the visual gesture as a reference frame, applying a general parametric model to the selected video frame to generate a specific parameter template of the visual gesture and receiving one or more video frames. For each subsequently received video frame of the visual gesture, the embodiment of the method includes the steps of detecting a visual contour of the visual gesture based at least in part on the specific parametric template of the visual gesture and recognizing the visual gesture based at least in part on the detected visual contour.

One embodiment of the computer-implemented method includes steps of applying a motion-assisted gesture recognition process to the multiple video frames capturing the visual gesture. The steps of the method include detecting motion of an object contained in the multiple video frames capturing the visual gesture and recognizing the visual gesture based on the detected motion. The steps of the method further includes tracking the motion of the object across a subset of the multiple video frames and obtaining estimated motion parameters of the object based on the tracking. The steps of the method also include refining the estimated motion parameters of the object based on the tracking and recognizing the visual gesture based on the refinement of the estimated motion parameters of the object.

One embodiment of the computer-implemented method includes steps of applying a position-based gesture recognition process to the multiple video frames capturing the visual gesture. The position-based gesture recognition process can use a motion-assisted object tracking process, a secondary object tracking process or a mixed process that applies both the motion-assisted object tracking process in parallel with the secondary object tracking process. The steps of the method include detecting changes of position of an object contained in the multiple video frames capturing the visual gesture and recognizing the visual gesture based on the changes of position of the object. The steps of the method further include recording the changes of position of the object, quantizing the changes of position of the object and recognizing the visual gesture based on the quantized changes of position of the object. The changes of position of the object can be recorded by its instantaneous position change over an immediately previous position of the object or by its reference change of the object over a pre-defined reference position of the object.

To track motion of an object contained in the multiple video frames capturing the visual gesture, one embodiment of the method includes steps of applying a motion-assisted object tracking process and a secondary object tracking process based on recent tracking-learning-detection in parallel to the multiple video frames. The dual object tracking provides two parallel routes after initialization, each of which generates its own object tracking results, and whose combined results improve system performance. Furthermore, each route can be switched on and off on the fly based on the available computer resource. Another performance advantage provided by the duel object tracking is the flexibility and scalability for object tracking in association with the characteristics of human visual gestures being analyzed. For example, the dual object tracking can readily be extended to process various types of visual gestures, e.g., position-, shape-, motion-based or mixture of different types of visual gestures.

Another embodiment of the invention develops simple visual codes to express a variety of commands, e.g., to capture, reference, edit, or transmit multimedia messages, which are useful in real-time multimedia applications in a mobile communications environment. A visual code comprises multiple recognized human visual gestures, which are encoded based on a user command. The visual codes can be used for a variety of applications, such as video editing, including capturing, splicing, blending and other manipulation of videos, and further areas of applicability of the visual codes will become apparent from the detailed description provided hereinafter.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 16 illustrates a table of example video editing commands and possible indications via the commands in accordance with an embodiment of the invention.

FIG. 17 illustrates experimental data of performance improvement provided by motion-assisted visual recognition in accordance with an embodiment of the invention.

The figures depict various embodiments of the invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1:
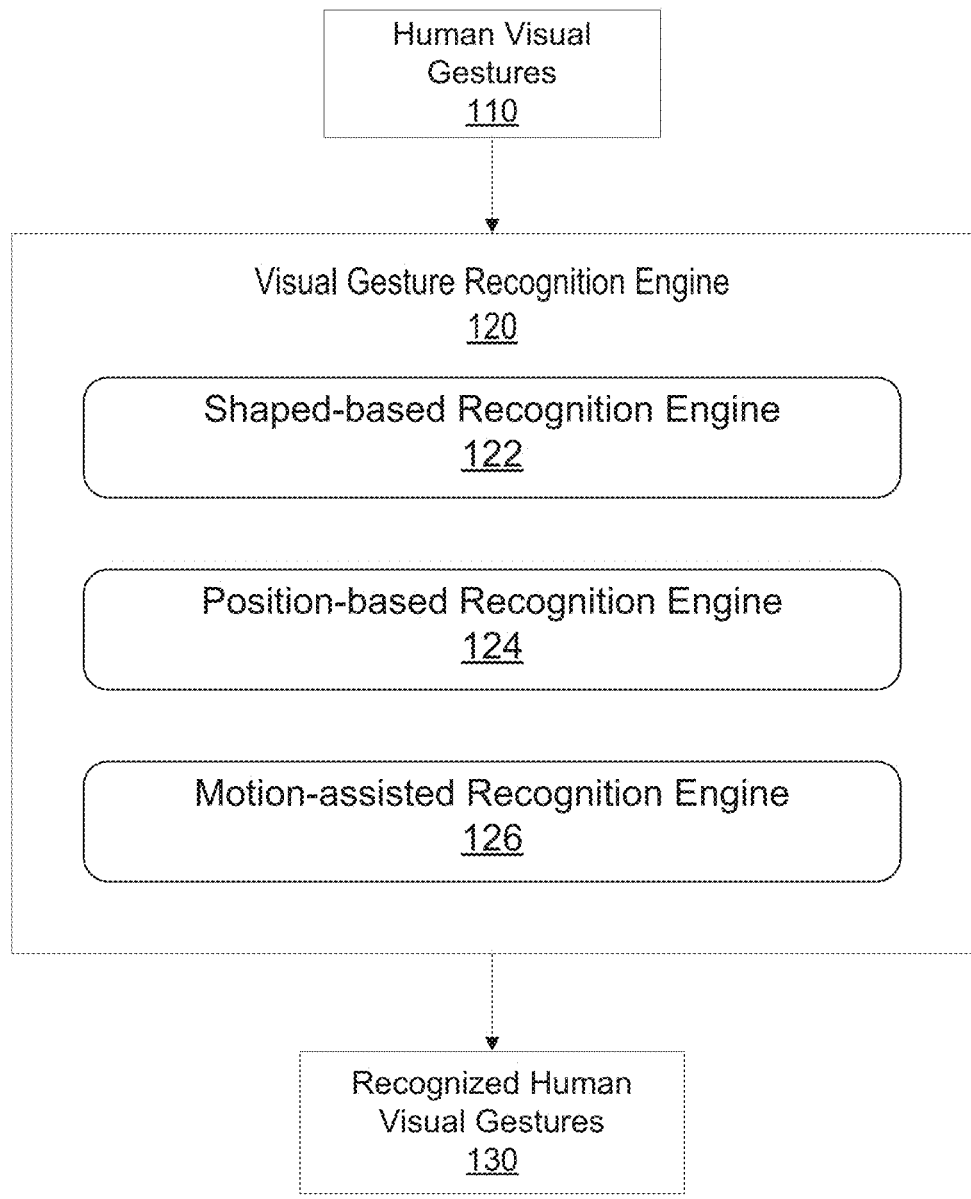
FIG. 1 is a diagram of a computer system for recognizing human visual gestures in accordance with an embodiment of the invention.

FIG. 1 illustrates a computer system 100 for recognizing human visual gestures. In one embodiment, the computer system 100 includes a human visual gesture recognition engine 120. The human visual gestures 110 include static digital images of a variety of human visual gestures, such as a hand gesture formed/positioned by a user hand, a body gesture positioned by a human body, and a facial gesture represented by a user face. Other embodiments of the human visual gestures 110 may include an input video of dynamic human visual gestures that may involve motion or change of position, e.g., hand gestures, body gestures and facial gestures of a human user. The input video includes one or more video frames of human visual gestures and the system 100 processes the video frames of the input video to recognize human visual gestures contained in the video frames.

The visual gesture recognition engine 120 is configured to recognize the human visual gestures by an appropriate visual gesture recognition engine. In one embodiment, the visual gesture recognition engine 120 has a shaped-based recognition engine 122, a position-based recognition engine 124 and a motion-assisted recognition engine 126. Other embodiments of the visual gesture recognition engine 120 may have other types of recognition engines or a recognition engine that combines two or more different recognition engines such as the shape-based recognition engine 122 and the motion-assisted recognition engine 126. The visual gesture recognition engine 120 is configured to select an appropriate visual recognition engine based on a user selection of a gesture recognition engine and/or determination of a type of visual gesture. The visual gesture recognition engine 120 is further described below with reference to FIG. 2-FIG. 11.

Figure 2:
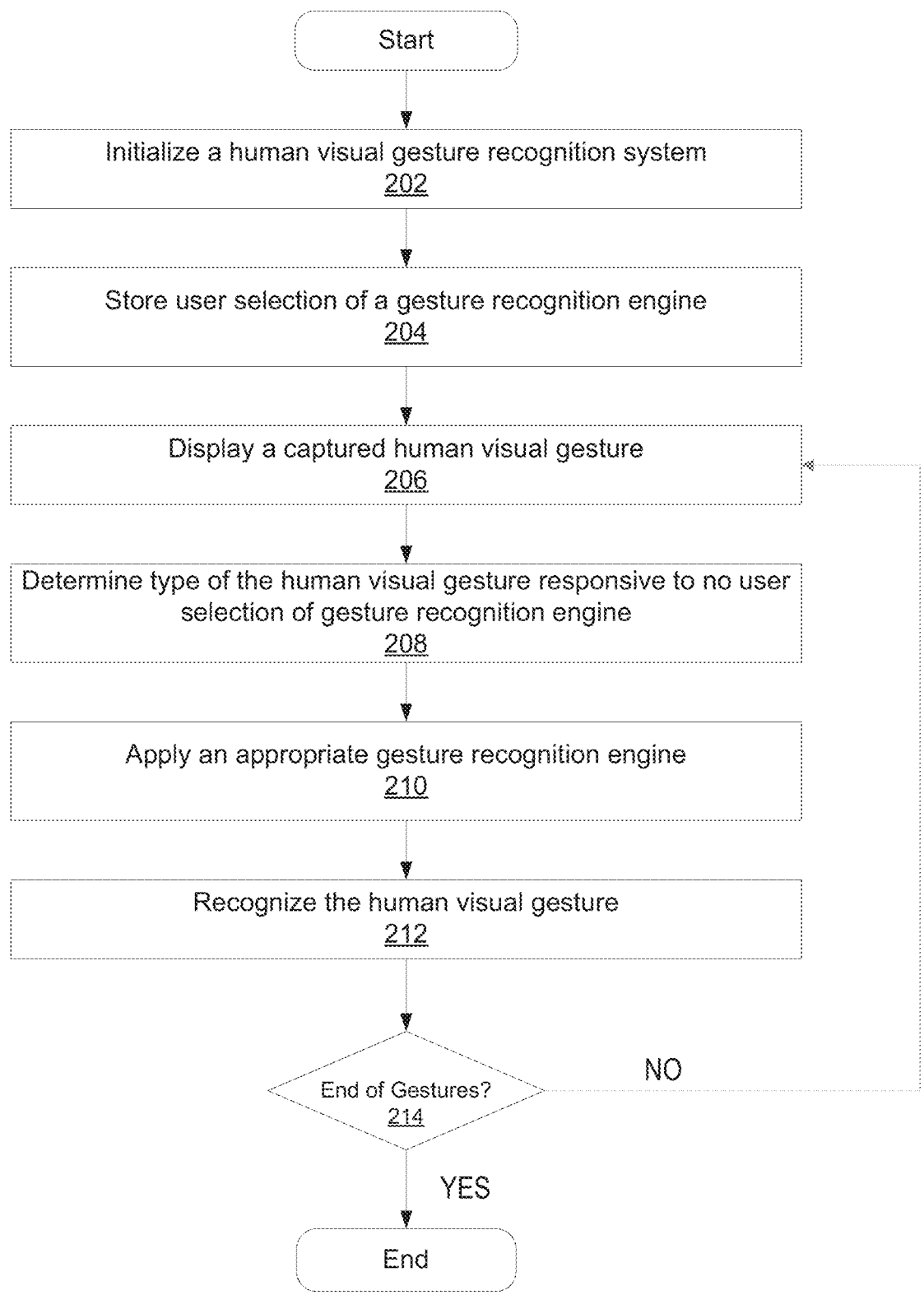
FIG. 2 is a flow chart of a process of recognizing human visual gestures in accordance with an embodiment of the invention.

FIG. 2 is a flow chart of a process of recognizing human visual gestures in accordance with an embodiment of the invention. A computer system 100 as illustrated in FIG. 1 is initialized 202 for recognizing human visual gestures as represented in a static digital image or in one or more video frames of a video that captures the human visual gestures. The initialization can be automatic or semi-automatic upon the initialization of an input device such as a computer mouse or keyboard.

Different initialization methods can be used to initialize the computer system 100. In one embedment, the computer system 100 is configured to freeze the first frame of a video that captures the human visual gestures of a user, e.g., a hand gesture, and provide a user interface that allows the user to click or drag a region of interest (ROI) containing the visual gesture object (e.g., user hand, face or body). Upon the user selection of the ROI, the computer system 100 is configured to track pixels in the ROI and recognize the visual gesture based on the tracking. This initialization process requires keyboard/mouse input from the user, thus, it is not automatic.

In an embodiment of automatic initialization, the computer system 100 is configured to present a predefined ROI on a computer screen and ask a user to put an object (e.g., user hand, face or body) in the ROI during the first preselected number of video frames of the video that captures the human visual gestures. The computer system 100 is configured to track pixels in the ROI and recognize the visual gesture based on the tracking.

In another embodiment of automatic initialization, the computer system 100 is configured to detect and track the motion of an object, e.g. (a user hand, face, or body). The computer system 100 is configured to track the object motion for a preselected number of initial frames of the video that captures the human visual gestures and segments the scene in a video frame into a ROI and background region. In one embodiment, the computer system 100 is configured to obtain the ROI based on motion vectors associated with the motion of the object. The centroid of a cluster of significant motion vectors is used as the centroid of the ROI. Suppose there are N significant motion vectors, and (x(n), y(n)) is the position of motion vectors MV(n), for n=1, 2, 3, . . . N, the position of the ROI, P_x and P_y is defined by Equation 1 and Equation 2 below.

$$P\_x = \frac{1}{N}\sum_{n=1}^{N} x(n) \quad \text{(Equation 1)}$$

$$P\_y = \frac{1}{N}\sum_{n=1}^{N} y(n) \quad \text{(Equation 2)}$$

The computer system 100 is configured to track pixels in the ROI and recognize the visual gesture based on the tracking.

The computer system 100 is further configured to store 204 a user selection of a gesture recognition engine. A gesture recognition engine is configured to recognize visual gestures formed portrayed by a part of human body such as a human hand, face (including gestures made by the eyes and/or lips) or body. Examples of the gesture recognition engine include shape-based recognition engine, position-based recognition engine, motion-assisted gesture recognition engine and mixed gesture recognition engine that combines multiple gesture recognition engines for the visual gesture recognition. Other visual gestures recognition engines may be used for expressions in a human or computer language, interaction in a virtual reality immersion experience as such as video gaming and/or viewing and creating visual art. In one embodiment, the computer system 100 is configured to present the multiple recognition engines as buttons in a graphic user interface (GUI) and highlight a button as a user moves his/her hand over the button on the GUI. A button is selected by one of the two ways by the user: staying on a button for a prescribed time period or visually pressing a button by a special gesture.

In the step 206, the computer system 100 is configured to display on a computer display screen a human visual gesture captured by a digital recording device such as a digital camera. In one embodiment, there are three basic types of human visual gestures: position-based, shape-based and motion-assisted. Other embodiments can have other types of human visual gestures, e.g., visual gestures that involve both shape and motion. Responsive to no user selection of a visual gesture recognition engine, the computer system 100 is configured to determine 208 the type of the visual gesture and to apply 210 an appropriate gesture recognition engine based on the determination. Using the selected gesture recognition engine, the computer system 100 is configured to recognize 212 the human visual gestures. Responsive to the human visual gestures being captured in a video, the computer system 100 is configured to determine 214 whether all the gestures have been recognized. If there are still visual gestures left for recognition, the computer system 100 is configured to repeat the steps of 206 to 214.

Figure 3:
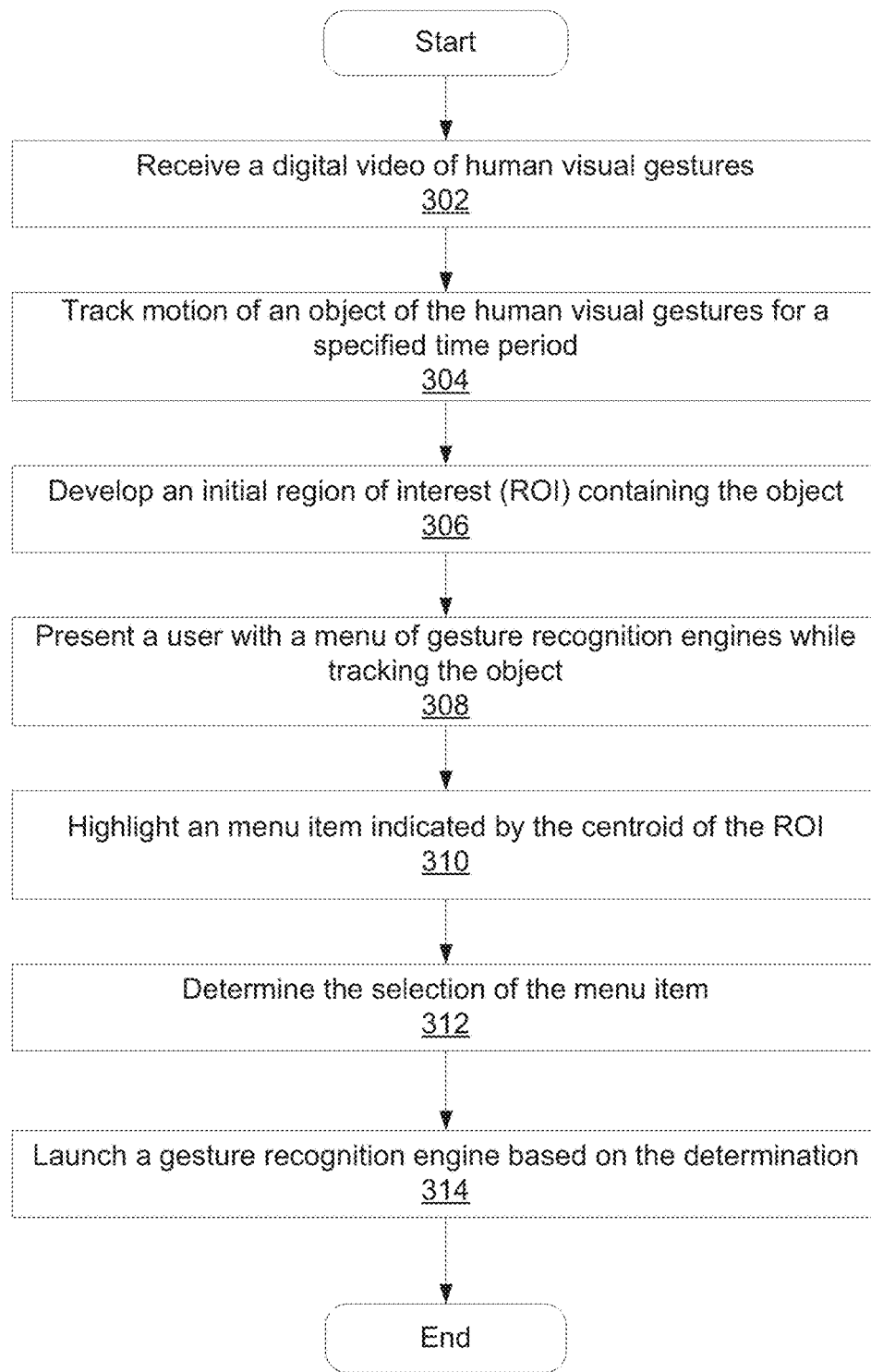
FIG. 3 is a flow chart of process of recognizing human visual gestures based on a touch-free user selection of a gesture recognition engine mode in accordance with an embodiment of the invention.

FIG. 3 is a flow chart of a process of recognizing human visual gestures based on a touch-free user selection of a gesture recognition engine in accordance with an embodiment of the invention. A computer system 100 as illustrated in FIG. 1 receives 302 a digital video of an object of human visual gestures such as a user hand and tracks 304 the motion of the object for a specified period of time. The computer system 100 is further configured to develop 306 an initial ROI bounding the object and to present a user with a menu of gesture recognition engines, e.g., as buttons in a GUI, while tracking the object's movement. Responsive to the centriod of the ROI overlays a button, the computer system 100 is configured to highlight 310 the button and to determine 312 the selection of the button if the button is highlighted for a specified period of time, or being clicked by the user. Upon the selection of the gesture recognition engine, the computer system 100 is configured to launch 314 a gesture recognition engine corresponding to the user selection.

Hand Gesture Recognition

Hand gesture recognition is the problem of recognizing pre-defined shapes and figures, positions taken, and any associated motions, formed with a human hand. Hand gestures recognition has a vast array of applications as hands are a natural and potentially powerful input device. To simplify illustration of various embodiments of the invention, the description from herein uses hand gesture recognition as an example for purposes of illustration only. One skilled in the art will readily recognize from the following discussion that alternative embodiments of the structures and methods illustrated herein may be employed without departing from the principles of the invention described herein. Further, one skilled in the art will readily recognize from the following discussion other types of human visual gesture recognition can be implemented without departing from the principles of the invention described herein. For example, the visual gesture recognition engine 120 of FIG. 1 is readily applicable to recognize human body gestures and facial gestures similarly as to the hand gesture recognition described below.

Figure 4:
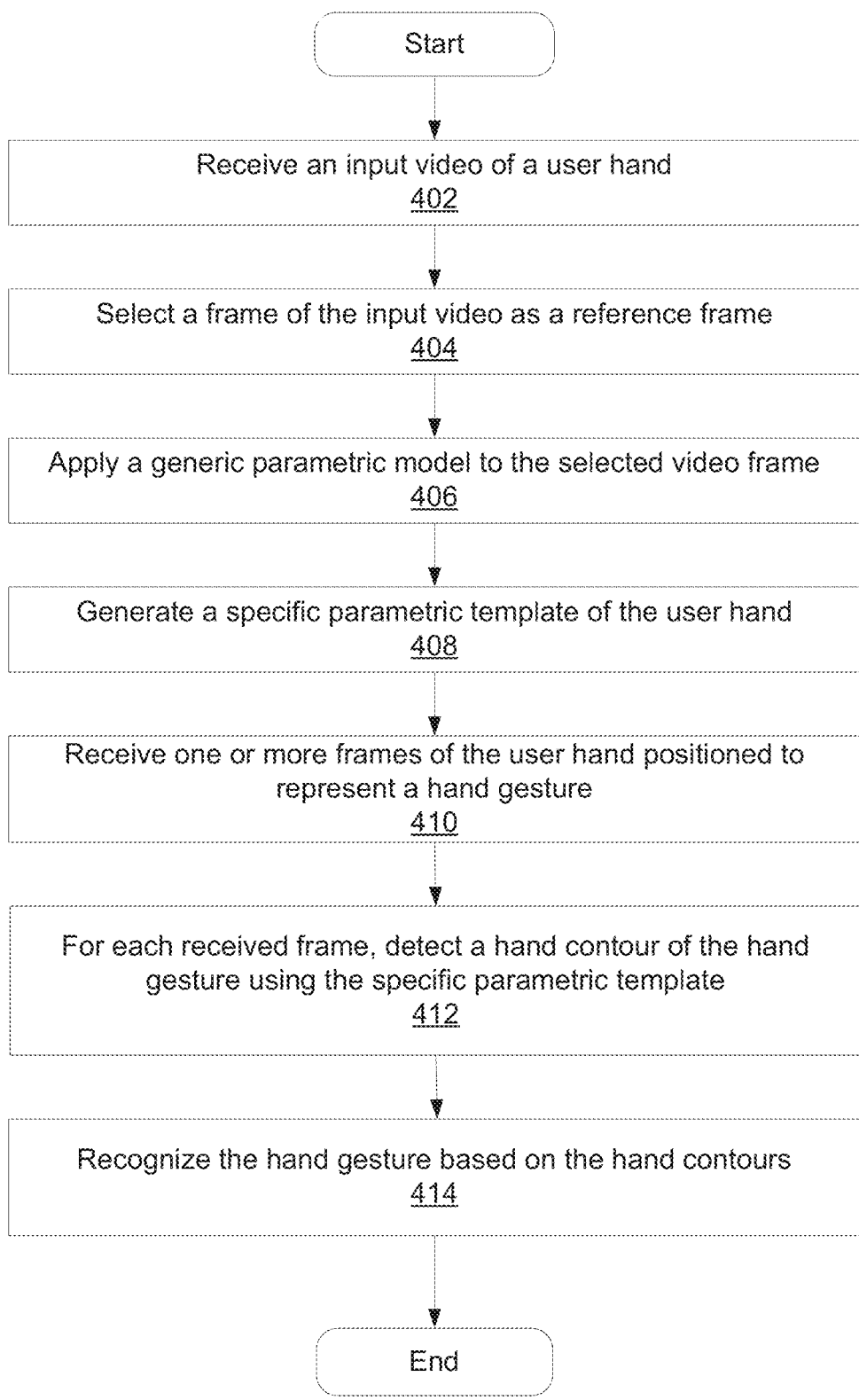
FIG. 4 is a flow chart of a process of shape-based hand gesture recognition in accordance with an embodiment of the invention.

In one embodiment, the visual gesture recognition engine 120 applies a shaped-based recognition engine 122 to an input video of human visual gestures to recognize the human visual gestures contained in the video. FIG. 4 is a flow chart of shape-based hand gesture recognition by an embodiment of shape-based recognition engine 122 as illustrated in FIG. 1. Initially, the shape-based recognition engine 122 is configured to receive 402 an input video of user hand, which includes multiple video frames. The shaped-based recognition engine 122 is configured to select 404 a video frame of the input video as a reference frame and apply 406 a generic parametric model to the selected video frame. The shaped-based recognition engine 122 is configured to generate 408 a specific parametric template of the user hand contained in the reference frame. The shaped-based recognition engine 122 is further configured to receive 410 one or more video frames of the input video. For each of the received video frames, the shaped-based recognition engine 122 is further configured to detect 412 a hand contour of the user hand positioned to represent a hand gesture in the video frame using the specific parametric template of the user hand. Based on the detected hand contours, the shaped-based recognition engine 122 is further configured to recognize 414 the hand gestures positioned by the user hand in the video frames of the video. A further description of embodiments of the shape-based visual gesture recognition is provided in the following patent/patent applications: U.S. patent application Ser. No. 13/830,787, which is incorporated by reference in its entirety herein.

In addition to shape of a visual gesture portrayed/formed by a human hand, position and motion of the hand gesture can also be employed to define and recognize hand gestures. For example, the American Sign Language for English alphabet letters has some hand gestures, e.g., hand gestures for letter "J" and letter "Z," that involve both shape and motion of a user hand. It is noted that position of a hand gesture relies on at least some motion of the hand as the position of a hand can be inferred by integrating motion of the hand. Conversely, motion of a hand is a derivative of position of the hand, and can be viewed as secondary if the position of the hand were easier to detect than detecting motion of the hand. Likewise, acceleration and higher derivatives similar to those captured by physical sensors, e.g., physical accelerometer sensors, can also be used as input data to position-based or motion-assisted visual gesture definition and recognition.

Hand gesture recognition that involves motion of a human hand portraying the hand gesture can be conceptually divided into three tasks: hand detection, hand tracking, and gesture recognition. Hand detection aims to detect a human hand captured in a digital image and segment it from other background image pixels of the digital image of the hand. One embodiment of hand detection is to provide a region of interest (ROI) on a display screen for the user to put his hand (part or whole hand) into it. Another embodiment of hand detection is to detect the hand from its appearance (e.g., by skin detection and/or shape recognition). A third embodiment is to request the user to move the hand, and segment the hand image from the background image using motion estimation and motion segmentation. Once the hand is segmented or defined by an ROI, the hand can be tracked across multiple video frames of a video that captures the hand movement. The tracked hand and ROI are provided to a visual gesture recognition engine (e.g., the visual gesture recognition engine 120 in FIG. 1), which is configured to detect and classify a hand gesture from a pre-defined vocabulary of gestures.

Referring back to FIG. 1, to use the motion vectors of the video frames that capture the hand gestures formed by a human hand, the motion-assisted recognition engine 126 of the visual gesture recognition engine 120 is configured to track the motion of objects (e.g., the human hand) in the video and use the motion vectors for the blocks occupied by the objects as additional features in the analysis and recognition of hand gestures. The motion estimation described above is general, and can be used to analyze the motion not only for hand gestures, but also for facial or body movements and gestures. In particular, the motion estimation scheme enables new motion-based features in video based sensing and pattern recognition. The features can be based on time history of motion vectors generated, as well as the evolution of the spatial regions and their features extracted from individual frames.

Figure 5:
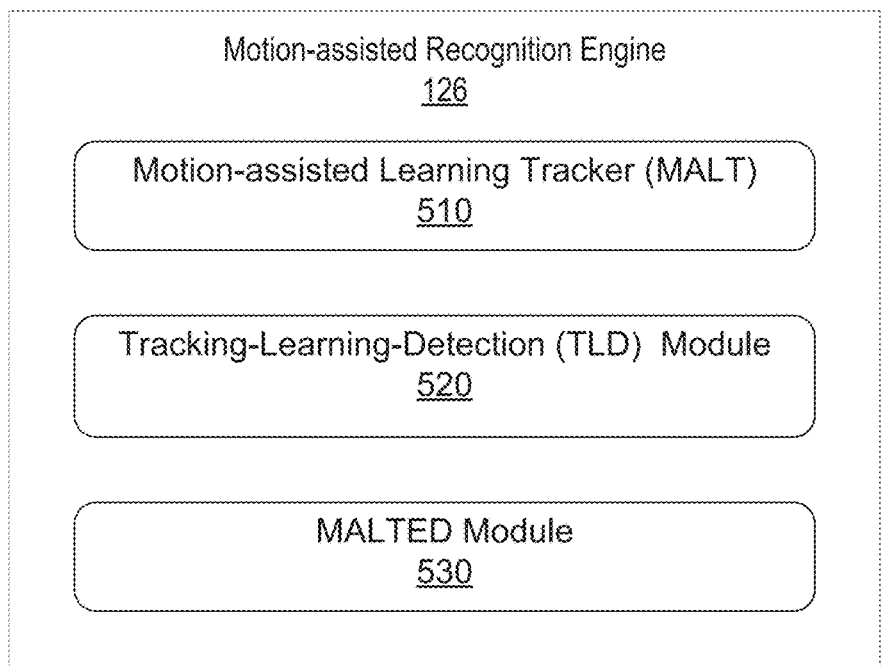
FIG. 5 illustrates an exemplary motion-assisted recognition engine for human visual gesture recognition in accordance with an embodiment of the invention.

FIG. 5 illustrates an exemplary motion-assisted recognition engine 126 for visual gesture recognition. In the embodiment illustrated in FIG. 5, the motion-assisted recognition engine 126 has a motion-assisted learning tracker (MALT) 510, a tracking-learning-detection (TLD) module 520 and a motion-assisted learning tracking and enhanced detection (MATLED) module 530. The MALT 510 is configured to track the movement of a user hand forming the visual gestures captured in a video by leveraging the advantages provided by optimized block-based motion estimation (e.g., block-based motion estimation as used in video coding standards such as the ITU standards H.264 and H.265). The TLD module 520 is configured to learn and track objects (e.g., a human hand) captured in a video of the visual gestures. The MALTED module 530 is configured to learn and track objects of visual gestures with the assistance of motion vectors of the objects.

Motion-Assisted Learning Tracker (MALT)

Figure 6:
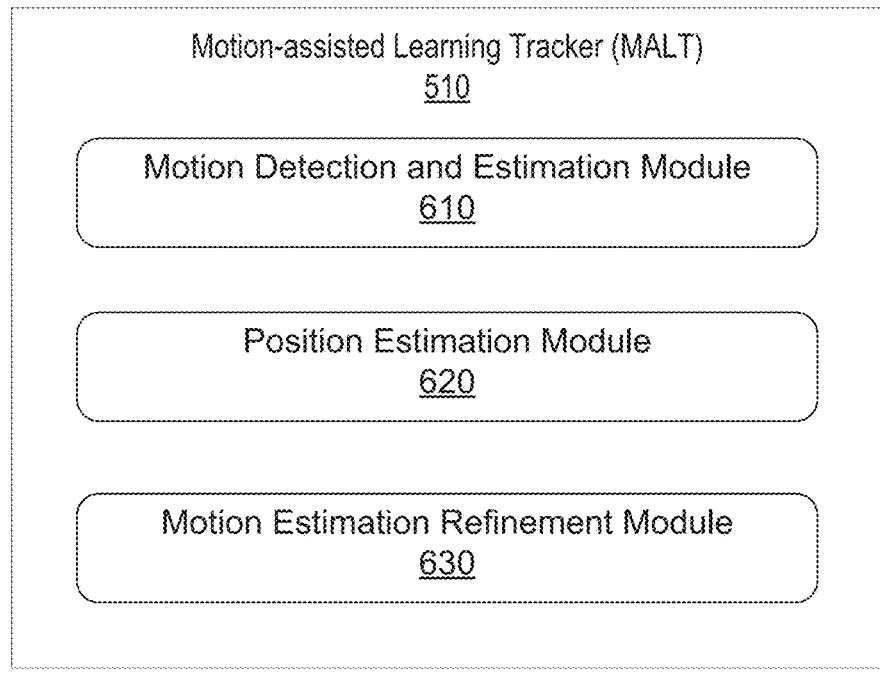
FIG. 6 illustrates an exemplary motion-assisted learning tracker (MALT) for visual gesture recognition in accordance with an embodiment of the invention.

FIG. 6 illustrates an exemplary motion-assisted learning tracker (MALT) 510 for visual gesture recognition. In the embodiment illustrated in FIG. 6, the MALT 510 has a motion detection and estimation module 610, a position estimation module 620 and a motion estimation refinement module 630. Upon the initialization of the motion-assisted recognition engine 126, the MALT 510 is activated for detecting and estimating the movement of visual gestures (e.g., hand gestures) across video frames of the video that captures the visual gestures. The MALT 510 activation includes initializing an ROI of a visual gesture to be tracked and the ROI contains at least a part of a segmented hand to be tracked. The initial ROI is denoted as R_I, and P_I and Sz_I are the center point of position of R_I and size of R_I, respectively, in the follow description, and where size can be selected as a length or area parameter.

In one embodiment, the motion detection and estimation module 610 is configured to employ any existing motion estimation schemes known to those of ordinary skills in the art to derive motion vectors of the video that captures the human visual gestures. For example, the motion detection and estimation module 610 is configured to derive motion vectors of video frames of the video by tracking the motion of objects/regions on a block-by-block basis within successive video frames, and generating motion vectors for each block using inter-frame predictions among the video frames. A further description of embodiments of the motion estimation and motion vectors is provided in the following patent/patent applications: U.S. Patent Publication No. 2006/0245497, U.S. Patent Publication No. 2007/0127577 (now U.S. Pat. No. 8,428,135), and U.S. Patent Publication No. 2010/0290529 (now U.S. Pat. No. 8,520,736), which are incorporated by reference in their entirety herein.

To estimate motion of an object in a video frame in the video of the captured visual gestures, the motion detection and estimation module 610 is configured to calculate block-based motion vectors (MVs) for every captured frame by maximizing a similarity metric (or minimizing a dissimilarity measure). In one embodiment, motion estimation is block-based, using the Sum of Absolute Difference (SAD) metric of pixels in the blocks for selecting motion vectors. The block-based motion estimation as described above is scalable upwards to Mean Squared Error (MSE) and Normalized Correlation Coefficient (NCC) as needed. The motion vectors obtained by the motion detection and estimation module 610 are denoted as MV_C from herein.

The position estimation module 620 is configured to estimate the ROI position (denoted as P_E) from the ROI position in a previous frame (denoted as P_pre). The ROI position can be estimated from the ROI position in the previous frame using a linear estimator as described in Equation 3 below:

$$P\_E = P\_pre + MV\_C. \quad \text{(Equation 3)}$$

If the object moves out of the scene, as P_pre) can be unavailable. Non-trivial motion vectors will be detected along the trajectory of the incoming object responsive to its returning to the camera view. The estimated ROI position P_E can be detected using Equations 1 and 2 similarly to initialization described above. In practice, the trajectory of the ROI is expected to be a reasonably smooth continuous curve. To eliminate irregular drift off of the estimated P_E from the trajectory of ROI, a Kalman filter can be used to obtain a smoother estimation of the trajectory of ROI positions using Equation 4 below.

$$P\_E = \text{KalmanFilter}(P\_E, P\_pre). \quad \text{(Equation 4)}$$

Similarly, based on the assumption that size of ROI will not significantly change between two successive frames, the size of ROI Sz_E can be estimated from the previous size of ROI Sz_pre.

$$Sz\_E = Sz\_pre \times \text{Scale}. \quad \text{(Equation 5)}$$

Here, Scale is expected to be a scaling factor very close to 1.0 (e.g., 0.98 or 1.02). The estimated ROI R_E can be described by the parameters P_E and Sz_E.

The motion estimation refinement module 630 is configured to refine coarse motion estimation to get a more accurate approximation. For a 2D visual gesture recognition, only the position of ROI, P, is refined, while both position P and size Sz are jointly refined for 3D and/or multi-dimensional visual gesture recognition. The ROI motion refinement is denoted as R_Re, which can be written as a function of the position and size parameters R(P, Sz). A local search window for carrying out the refinement process can be described by a center point W_c, width W_w, and height W_h as W(W_c, W_h, W_w). An initial prediction and motion estimation is refined by a local search using a more powerful image similarity metric, such as the Normalized Correlation Coefficient (NCC) defined by Equation 6 below.

$$ncc(R_1, R_2) = \frac{1}{n}\sum_{x=1}^{n} \frac{(R_1(x) - \mu_1)(R_2(x) - \mu_2)}{\sigma_1 \sigma_2} \quad \text{(Equation 6)}$$

Here, $\mu_1$, $\mu_2$, $\sigma_1$, and $\sigma_2$ are the means and standard derivations of $R_1$ and $R_2$. Furthermore, R_E and R_I are both resized to a fixed size (e.g., 15×15 pixels). The scaled down ROIs are denoted as SR_E and SR_I defined in Equation 7 below.

$$SR\_E = \text{resize}(R\_E); SR\_I = \text{resize}(R\_I) \quad \text{(Equation 7)}$$

A rectangle, Rect of a size of W×H is defined as below, where w is the width and h is the height $$\text{Rect}(Ct, w, h)$$

Accordingly, the search window of size W×H is $$\text{Rect}(P\_E, W, H)$$

To further refine the motion estimation, the motion estimation refinement module 630 is configured to recursively select a refined motion vector based on a similarity measure, e.g., normalized correlation coefficient (NCC) score, among multiple candidate ROIs. The candidate ROIs, R_test, are defined as in Equation 8 below:

$$R = \{R\_test = R(Ct, w, h), \text{ with } Ct \in \text{Rect}(P_E, W, H), w = \alpha * Sz\_pre\} \quad \text{(Equation 8)}$$

For each candidate ROI, R_test, in set R, a similarity metric, e.g., NCC is calculated. The candidate ROI that has the highest score is set as the detected ROI in the current frame.

$$R\_C = \max_{R \in R} ncc(\text{resize}(R), \text{resize}(R_I)) \quad \text{(Equation 9)}$$

The motion estimation refinement module 630 is further configured to update a set of reference ROIs if the object tracking performance at any point has a high confidence. In such scenario, the motion estimation refinement module 630 is configured to store a secondary reference ROI (and discard any previous secondary reference ROIs) and to update a set of reference ROIs as follows:

$$S_{ref} = \{R\_I, R\_C\} \quad \text{(Equation 10)}$$

If more than one reference ROI is used, the detected ROI in the current frame defined in Equation 9 is modified as:

$$R_C = \max_{E \in R, R_{ref} \in S_{ref}} ncc(\text{resize}(R), \text{resize}(R_{ref})) * \text{Conf}(R_{ref}) \quad \text{(Equation 11)}$$

where Conf($R_{ref}$) is the confidence coefficient of reference ROI $R_{ref}$.

Figure 7:
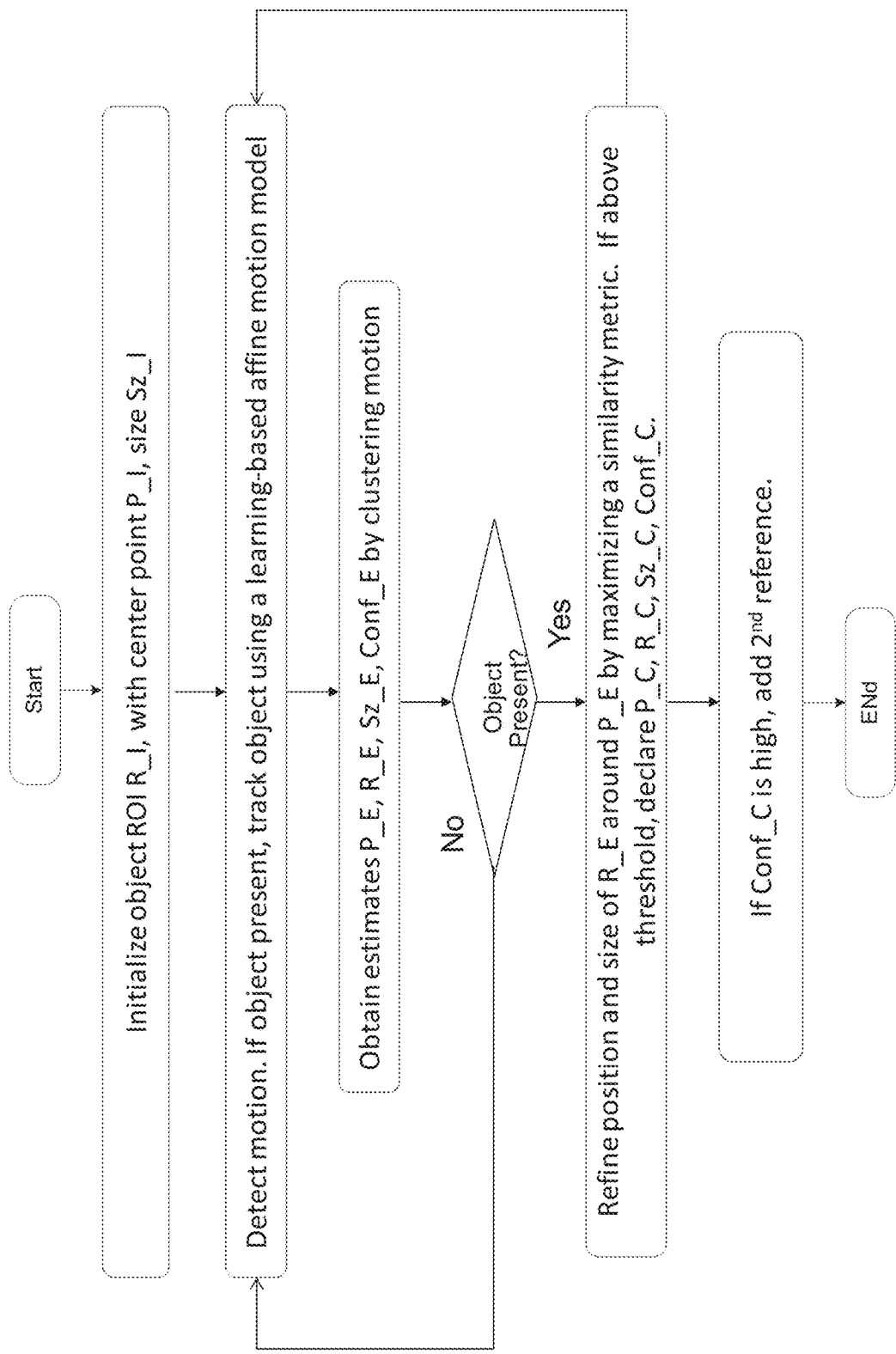
FIG. 7 is a flow chart of a process of motion detection and estimation of a human visual gesture using the MALT illustrated in FIG. 6.

FIG. 7 illustrates a flow chart of a process of motion detection and estimation of a human visual gesture in accordance of one embodiment of motion-assisted learning tracker (MALT) 510. The MALT 510 is configured to initialize a region of interest, R_I, of an object being processed with a center point, P_I and a size of Sz_I and keep the ROI as a main reference. The MALT 510 is configured to detect motion of the ROI. If the object is present and defined by an ROI, the MALT 510 is configured to track the object using a learning-based affine motion model with Kalman smoothing filtering if needed. The MALT 510 is configured to obtain estimates of parameters P_E, R_E, Sz_E and Conf_E as defined above by clustering detected motion. The MALT 510 is further configured to determine the presence of the object for motion estimation refinement. If the object is present, the MALT 510 is configured to refine the position and size of the object around the estimated position P_E of the ROI by maximizing a similarity metric, such as the normalized correlation coefficient (NCC) score. If the NCC score is above a threshold value, the MALT 510 stores the estimated parameters P_E, R_E, Sz_E and Conf_E. If the similarity metric is determined to be high, the MALT 510 adds a second reference and returns to the step of motion detection. If the object is not present for motion estimation refinement, the MALT 510 also returns to the motion detection step.

Position-Based Visual Recognition

With the MALT module 510, both position and motion based visual gestures recognition are analyzed in relation with motion detected and estimated of the visual gestures. Referring back to the position-based recognition engine 124 in FIG. 1, in one embodiment, the position-based recognition engine 124 is configured to quantize the changes of object position to represent different visual gestures. The position-based recognition engine 124 is configured to record the change of object position, P_change, either by instantaneous position change (IPC) or by reference position change (RPC). IPC records the change over the immediately previous position, i.e., $$P\_change = F(P\_C, P\_pre) = P\_C - P\_pre \quad \text{(Equation 12)}$$

Whereas RPC records the change over a pre-defined reference position, i.e., $$P\_change = F(P\_C, P\_R) = P\_C - P\_R \quad \text{(Equation 13)}$$

Vector P_change is quantized into different directions based on the requirements of a particular visual gestures recognition application. It is noted that for the same visual gesture, IPC and RPC may give different results. For example, P_C and P_R can be both at the right side of P_pre. RPC provides a "RIGHT" indicator while IPC provides a "LEFT" or "RIGHT" indicator depending on the relative position of P_C and P_R.

Figure 8:
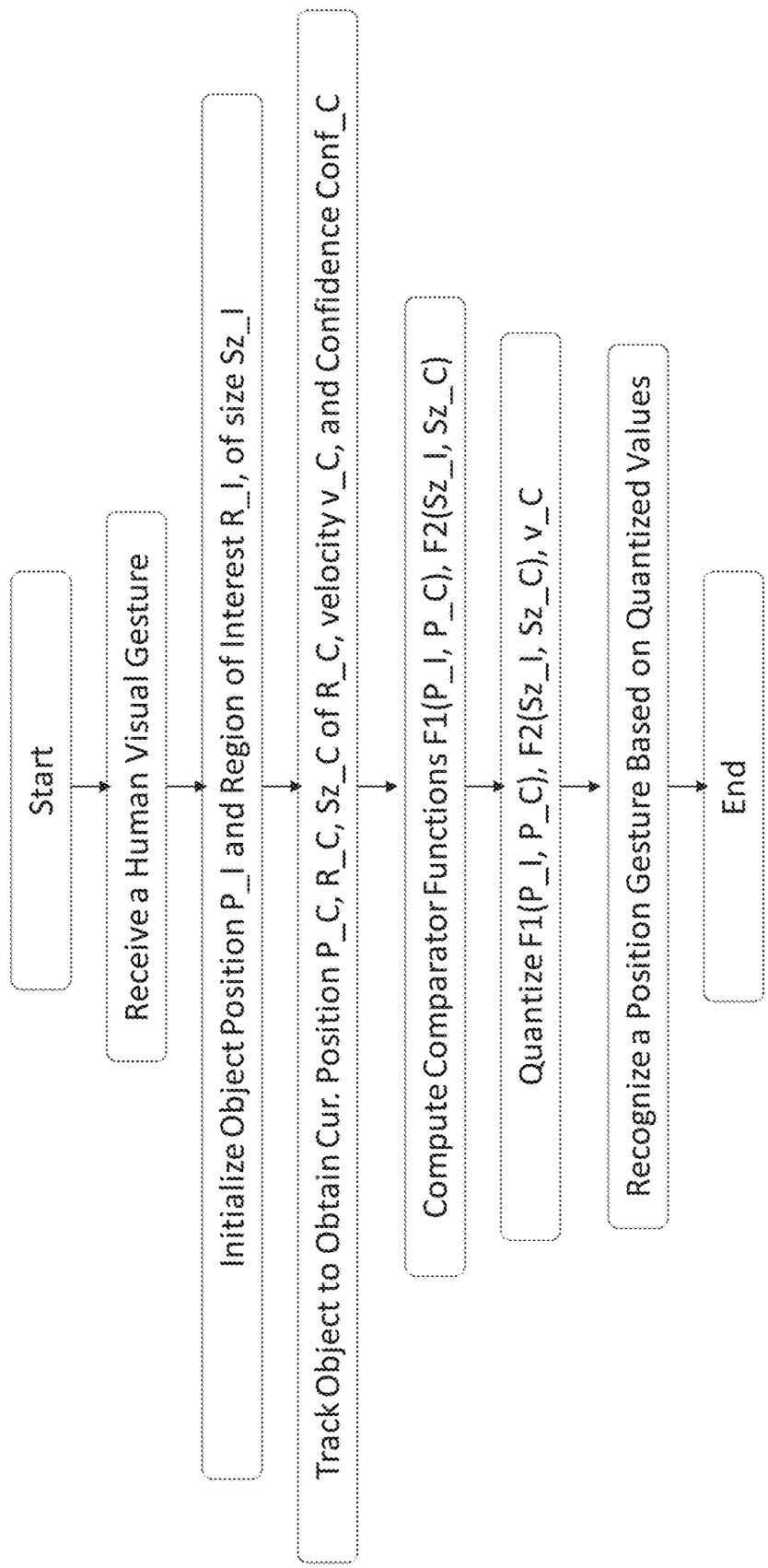
FIG. 8 illustrates steps of a process of position-based visual gesture recognition in accordance with an embodiment of the invention.

IPC is comparable to motion of a visual gesture detected through motion vectors. IPC detects instantaneous changes, so it is more sensitive to instantaneous direction change. RPC can be deemed as integration of instant changes, thus less sensitive to instantaneous direction change. The choice between IPC and RPC depends on the application of visual gesture recognition. IPC is good for highly quantized gestures, i.e., scroll up or down; RPC is better for continuous gesture interface. FIG. 8 illustrates a process of position-based visual gesture recognition in accordance with one embodiment of the position-based recognition engine 124. The initial position P_I is used as reference position. One exemplary function F1 can be defined as:

$$F1(P\_C, P\_I) = P\_C - P\_I \quad \text{(Equation 14)}$$

Given the fact that the size of object changes accordingly when object moves closer or farther from the sensor, the change of size, or zoom in and out, is used as an indicator of the third dimension of position, i.e., depth. One exemplary comparator function F2 can be defined as:

$$F2(Sz\_C, Sz\_I) = Sz\_C / Sz\_I \quad \text{(Equation 15)}$$

When $F2(Sz_C, Sz_I)$>threshold1, with threshold1>1, the change of size defined in Equation 15 means zoom-in. When F2(Sz_C, Sz_I)<threshold2, with threshold2<1, the change of size defined in Equation 15 means zoom-out.

As illustrated in FIG. 8, the position-based recognition engine 124 is configured to receive a human visual gesture, e.g., a hand gesture, and initialize parameters of the object to be tracked, including position P_I and a region of interest R_I of size Sz_I. The position-based recognition engine 124 is configured to obtain the object's current position, P_C, ROI's current position, R_C, size of the current ROI, Sz_C, velocity of the object, v_C and the confidence coefficient, Conf_C. The position-based recognition engine 124 is further configured to compute the comparator functions F1 as defined in Equation 14 and F2 as defined in Equation 15, and quantize the change of the object represented by the comparator functions F1, F2 and velocity of the object, v_C. Based on the quantized values, the position-based recognition engine 124 is configured to recognize the human visual gesture.

Tracking Learning Detection (TLD) and FV-TLD

Figure 9:
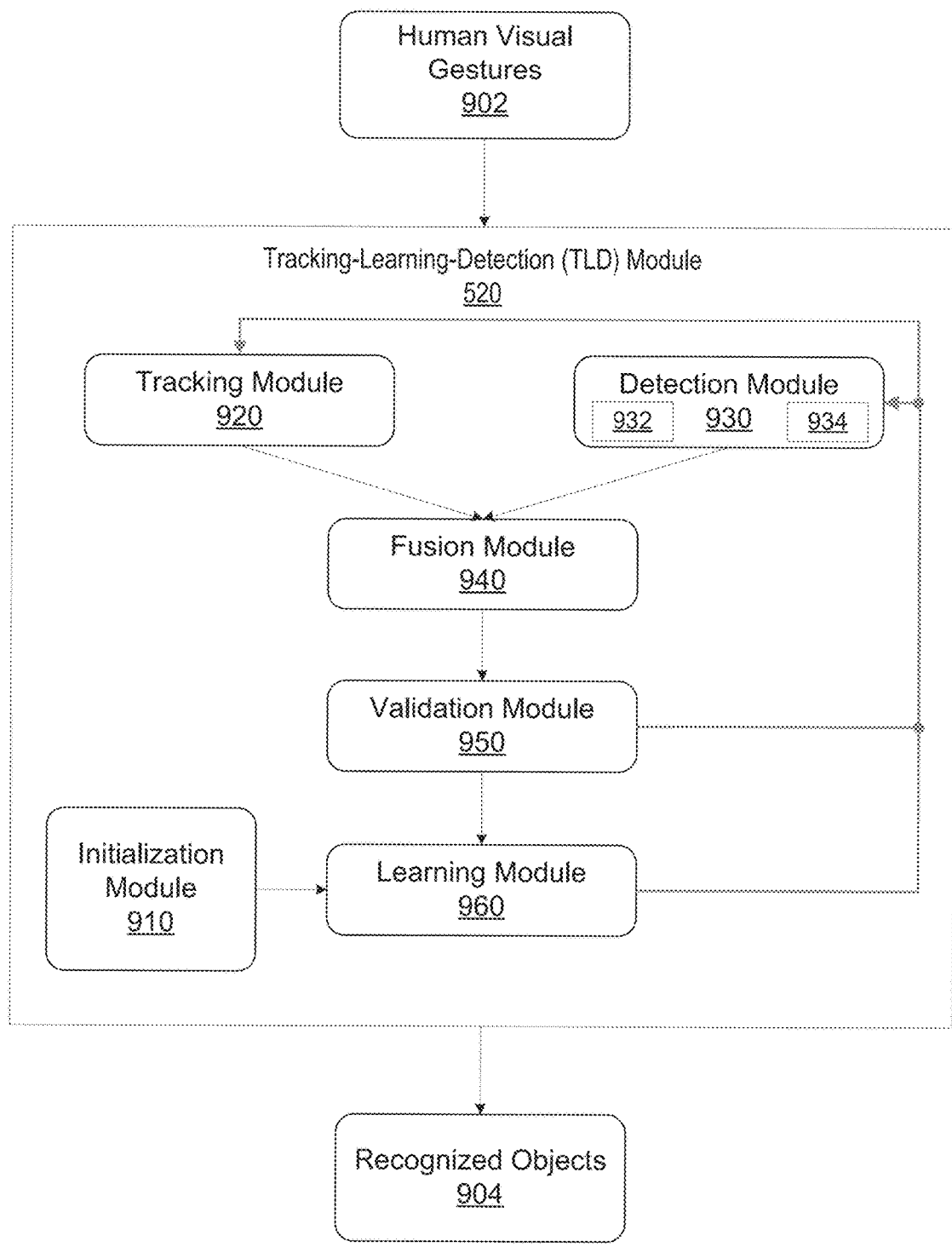
FIG. 9 illustrates an exemplary tracking-learning-detection module in accordance with an embodiment of the invention.

Referring back to the motion-assisted recognition engine 126 illustrated in FIG. 5, the tracking-learning-detection (TLD) module 520 of the motion-assisted recognition engine 126 is configured to track, learn and detect objects of a human visual gesture. FIG. 9 illustrates an exemplary TLD module 520 in accordance with one embodiment of the TLD module 520. In the embodiment illustrated in FIG. 9, the TLD module 520 has an initialization module 910, a tracking module 920, a detection module 930, a fusion module 940, a validation module 950 and a learning module 960. The TLD module 520 receives human visual gestures 902 captured in a video and generates objects 904 obtained in the human visual gestures (e.g., tracking, detection, and learning results, as well as gesture recognition results). In particular, the TLD module 520 tracks, detects, and learns simultaneously. A process that performs all three tasks of tracking, detecting and learning is referred to as a TLD-type process.

The initialization module 910 of the TLD module 520 is configured to initialize the TLD module 520 using one of the initialization methods described above with reference to FIG. 2, e.g., requesting a user to click/drag an ROI, or put his/her hand in a predefined ROI or present a moving object to a digital recording device. For example, the initialization module 910 is configured to provide the first instance of an object in an ROI, e.g., a bounding box, for the object learning module 960 to learn from. The initialization parameters such as the position and size of the ROI are communicated to the learning module 960 for further processing.

The tracking module 920 is configured to track objects contained in the video frames capturing the human visual signatures 904. Object tracking is closely related to object detection and the goal of object tracking is to identify instances of objects from non-objects. Existing methods include recursive optical flow tracking, tracking-by-detection, adaptive tracking and "long-term" tracking based on the corroboration among various object detection and tracking modules. It is noted that if an object detector were 100% reliable, object tracking would be unnecessary. But practically, learning to detect while tracking has proved to be a valuable approach. The tracking module 920 is configured to provide enhanced object tracking, potentially assisted with block-based motion estimation of objects provided by the MALT 510 described above. In one embodiment, the tracking module 920 is completely replaced with the block-based motion-estimation of MALT 510. Comparing with conventional point-wise optical flow and motion estimation whose high accuracy is at the expense of high complexity, object tracking assisted by the MALT 510 is fast and scalable with acceptable accuracy. To differentiate the enhanced object tracking using the MALT 510, a TLD module 520 configured to utilize the MALT 510 for object tracking and detection along with other enhancements is referred to as "FV-TLD" from hereon.

The object detection module 930 is configured to detect object contained in the human visual gestures 902. There are various ways to detect object by the object detection module 930. One method is a three-step object detection framework using the feature extraction module 932 and the feature analysis and matching module 934. The first step is to extract features from the video frames capturing the human visual gestures by the feature extraction module 932. The next step is to analyze the extracted features by the feature analysis and matching module 934, and the third step is to detect objects based on the analyzed features of the human visual gestures. Any existing object detection schemes such as template matching, minimum distance method, neural networks, support vector machines and maximum a posteriori probability method can be used to implement the object detection module in 930.

In one embodiment, the feature extraction module 932 is configured to extract features contained in the human visual gestures. Responsive to the human visual gestures being represented by static digital images, the feature extraction module 932 is configured to apply spatial transforms to the digital images, detect edges in the digital images, analyze level sets, and/or generate histograms of the digital images. In response to the dynamic human visual gestures contained in an input video, in addition to the functions associated with static digital images representing the human visual gestures (e.g., spatial transformation), the feature extraction module 932 is further configured to separate pixels in a video frame representing background from pixels representing the human visual gestures by background subtraction methods.

The feature analysis module 934 is configured to analyze the features extracted by the feature extract module 932. In one embodiment, the feature analysis module 934 is configured to filter the extracted features by thresholding and dividing the extracted features into clusters by various clustering techniques, e.g., vector quantization, K-means clustering and hierarchical clustering. The feature analysis module 934 is further configured to analyze the filtered feature clusters. In response to the dynamic human visual gestures contained in an input video, the feature analysis module 934 is also configured to analyze the evolution of features in video frames, and conduct feature tracking.

The object detection module 930 is configured to detect objects based on the analyzed features using any existing object detection scheme, e.g., neural networks, support vector machines and maximum posteriori probability. Other embodiments of the object detection module 930 include additional steps, such as the step of analyzing the evolution of extracted features and motion vectors of the human visual gestures, or an exemplar-driven object detection scheme. In exemplar-driven object detection framework, a single image of the object of interest is initially provided. With the object segmented (though not analyzed), the object is tracked. In this setting, spatial (or pixel) based methods can be more effective than feature-space based ones (e.g., transform coefficients). In another embodiment, the detector module 930 is limited to locally refining the results of the tracker module 920 using a similarity metric, rather than independently searching the entire video frame and at all scales for the object.

The fusion module 940 is configured to combine the object tracking results from the tracking module 920 and the object detection results from the detection module 930. The validation module 950 is configured to validate the object tracking and detection results and to provide the validated results back to the tracking module 910 and the detection module 930 for refinement. In one embodiment, the tracked points are validated by one or more error measures, e.g., a forward-backward error measure. Validly tracked points specify the motion of the ROI, allowing to update the tracking module 920 and detection module 530. Further, the validated results by the validation module 950 are provided to the object learning module 960 to learn the object's various appearances.

The object learning module 960 is configured to receive the initialization parameters and the validated object tracking and detection results and to learn the object contained in the human visual gestures 902. For example, the object learning module 960 is configured to separate object from non-object instances via binary classifiers and using positive-negative learning with structural constraints. The object learning module 960 starts the learning process with the first instance of an object in an ROI provided by the initialization module 910. In one embodiment, from the first instance of the object, a uniform grid of points is tracked to the next video frame, and the tracked points are validated by one or more error measures. Any existing method of object learning such as neural networks, vector quantization and support vector machines can be used to implement the object learning module 960.

It is noted that if the object being tracked, learned, or detected, is occluded or disappears from the camera view, it may in general reappear virtually anywhere in the scene. However, in a gesture recognition application space, it is reasonable to assume that the object will reappear close to where it went out of view, which allows the tracking-learning-detection as described above to use a much more limited search space for detecting the ROIs with enhanced object detection performance and speed.

As discussed above, the performance of TLD module 520 can be improved by replacing the object tracking module 920 of the TLD 510 with the motion estimation by the MALT 510. In addition, the object detection module 930 can be greatly simplified by relying in part on the tracker MALT 510, and reducing the object detection to a local search around the tracked ROI with a similarity metric. The improved TLD is referred to as "FV-TLD." The improved performance of object tracking/learning/detection can be obtained from the improved performance of individual modules of the TLD 520. In one embodiment, the object detection module 930 is configured to provide enhanced object detection assisted with block-based motion estimation of objects provided by the MALT 510 described above.

The fusion module 940 is also configured to provide an improved performance speed because of the motion-based object tracking and targeted object detection (e.g., ROI based detection) from the tracking module 920 and the detection module 930. For example, the tracking module 920 and the detection module 930 may run independently from each other. The detection module 930 needs to scan an entire video frame at all scaled to find the object, and such process can be complex. The detection complexity can be greatly reduced by limiting the detection scope based on the results of the tracking module 920.

Motion-Assisted Learning Tracking and Enhanced Detection (MATLED)

Figure 10:
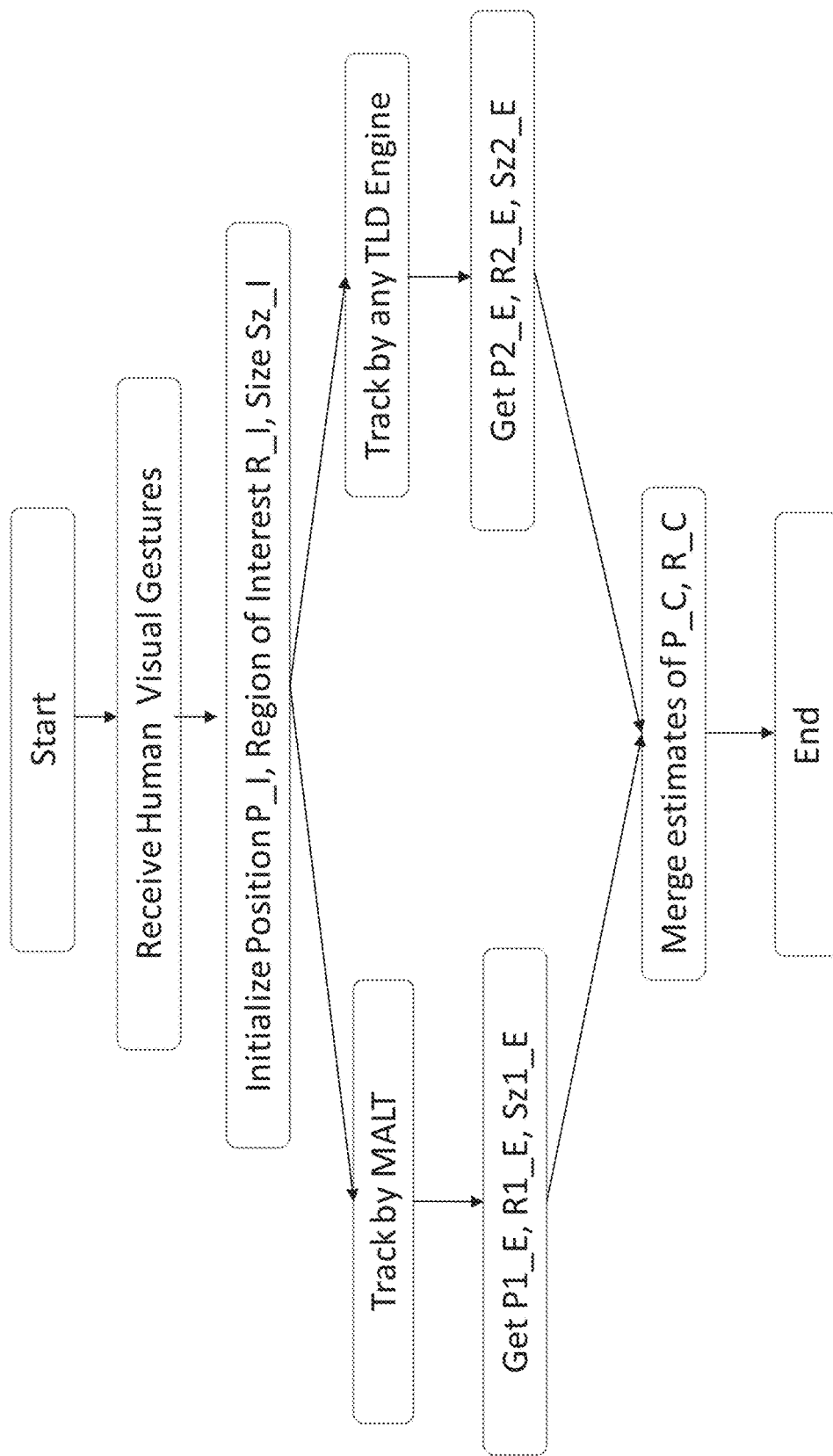
FIG. 10 is a flow chart of a process of enhancing visual gesture recognition using dual object tracking engines in parallel in accordance with an embodiment of the invention.

Referring back to the motion-assisted recognition engine 126 illustrated in FIG. 5, the motion-assisted learning tracking and enhanced detection module 530 is configured to combine the advantages provided by the MALT 510 and the enhanced TLD module 520 for visual gesture recognition. FIG. 10 is a flow chart of a process of enhancing visual gesture recognition using dual object tracking engines in parallel, the motion-assisted learning and tracking (e.g., MALT 510) and any variant of the tracking, learning and detection engine (e.g., TLD module 520). The object tracking results from both engines are combined for improved performance.

Initially, the MALTED module 530 is configured to receive human visual gestures captured in a video and is initialized. The initialization provides information about an identified ROI, R_I, its position, P_I and size, Sz_I and a first instance of an object within the identified ROI. The object is independently tracked in parallel by the MALT 510 and by a TLD module 520. Each of the tracking module gets a set of parameters of the estimated ROI, e.g., P1_E, R1_E and Sz1_E by the MALT 510 and P2_E, R2_E and Sz2_E by the TLD module 510. The tracking results from the two tracking engines are combined to improve the performance of the object tracking. There are various ways to combine multiple tracking results, e.g., based on scoring and past performance. In one embodiment, the MALTED module 530 is configured to compute a confidence score for each tracking engine and select the tracking results from the tracking engine that provides the higher confidence score. Further enhancements are possible by combining both track results by system training techniques. Responsive to one of the tracking engines failing to perform, the other working tracking engine is used to provide object tracking.

The dual tracking engine model illustrated in FIG. 10 is very useful in instances when one tracking engine, e.g., a secondary object tracking module such as the TLD module 520 fails to track, while the other (e.g., the MALT 510) may still be working. For example, the dual tracking engine model provides two parallel routes after initialization, each of which generates its own object tracking results. Furthermore, each route can be switch on and off on the fly based on the available computer resource. In one embodiment, the computing resource is first allocated to satisfy real time processing by the MALT 510, and the rest is provided to TLD module 520. Responsive to an indication that the total computing resource allocated to both tracking engines exceeding the total available computing resource, the TLD module 520 can be temporally disabled and will be resumed once enough computing resource is available.

Another performance advantage provided by the duel tracking engine is the flexibility and scalability for object tracking in association with the characteristics of human visual gestures being analyzed. Either engine can be turned off or ramped up as necessary and the parameters associated with the engine such as search spaces and similarity metrics can be simplified or scaled up. The experimental data (as illustrated in FIG. 17) of the MALTED module 530 shows that the TLD module 520 may be configured to solve the general problem of unknown object tracking for long-term, where the object being tracked is typically far-field with slow and deliberate motion of the visual gestures (e.g., position-based visual gesture recognition). The experimental data of the MALTED module 530 also shows that the MALT 510 is better suited to detect objects that are near-field with fast motion of the visual gestures (e.g., motion-based visual gesture recognition).

Figure 11:
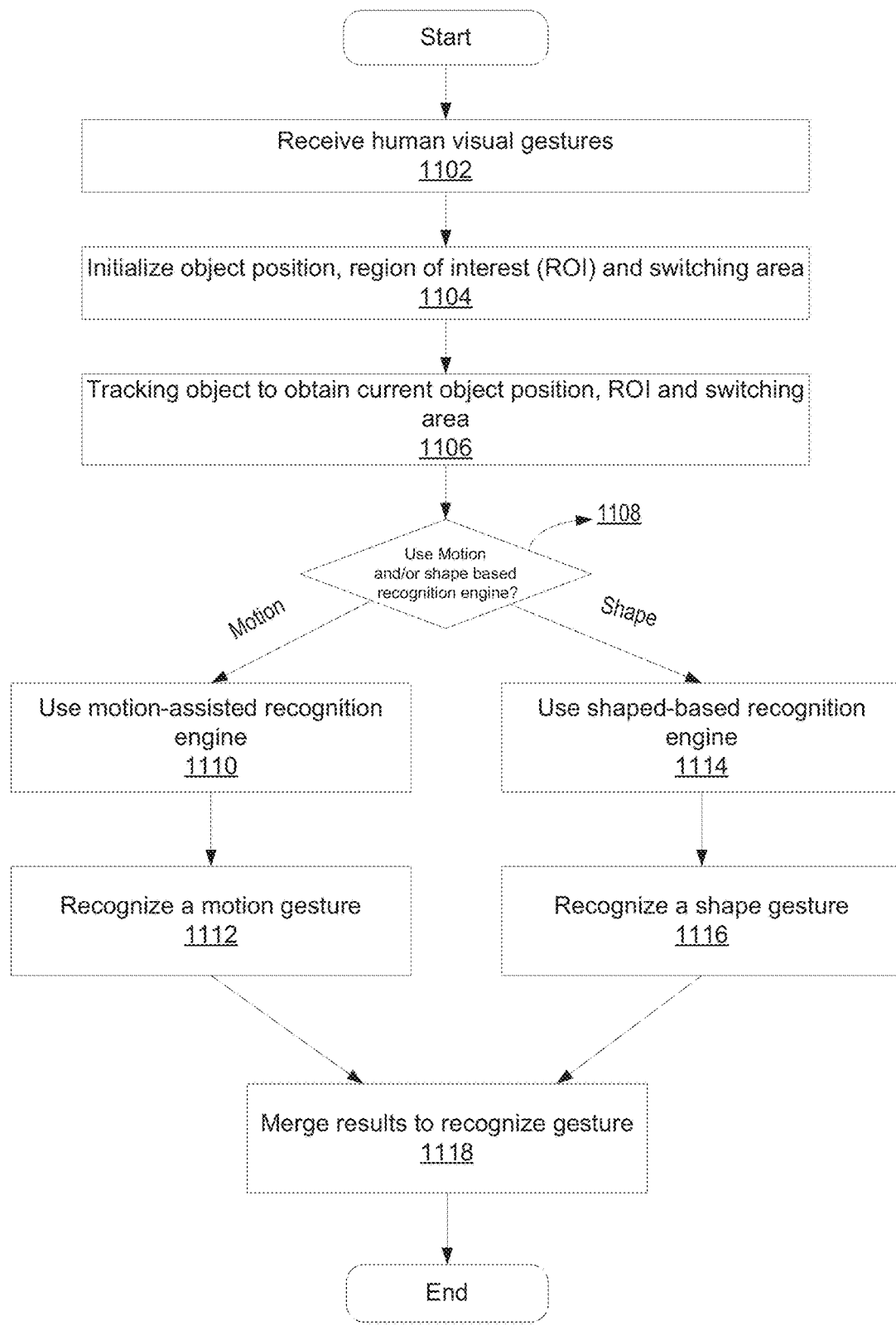
FIG. 11 is a flow chart of a process of recognizing objects contained in human visual gestures based on motion and/or shape of the objects in accordance with an embodiment of the invention.

The dual object tracking provided by the MALTED module 530 can be extended further to process various types of visual gestures, e.g., position-, shape-, motion-based or mixture of different types of visual gestures. FIG. 11 is a flow chart of recognizing human visual gestures based on motion and/or shape of the objects. FIG. 11 is a flow chart of a process of recognizing objects obtained in human visual gestures based on motion or shape of the objects. Initially, a visual gesture recognition engine 120 such as the one illustrated in FIG. 1 is configured to receive 1102 human visual gestures captured in a video. The visual gesture recognition engine 120 is initialized 1104 by identifying the position of the first object instance contained within a ROI and a switching region. The visual gesture recognition engine 120 is configured to track 1106 the object to obtain the current position of the object, the ROI and the switching region. The visual gesture recognition engine 120 is further configured to determine 1108 whether to use a shape-based recognition engine (as in FIG. 4), and/or a motion assisted engine (as in FIG. 5). In one embodiment, the determination is based on the analysis of the features extracted from the human visual gestures. Responsive to the determination that the shape-based recognition engine is needed, the visual gesture recognition engine 120 is configured to launch 1114 the shape-based recognition engine to recognize 1116 a shape gesture contained in the human visual gestures. Responsive to the determination that the motion-assisted recognition engine is needed, the visual gesture recognition engine 120 is configured to launch 1110 a motion-assisted recognition engine, e.g., the MALT 510, the TLD module 520, or the combined MALTED module 530, to recognize 1112 a motion assisted gesture contained in the human visual gestures. The results from both the motion-assisted gesture recognition and the shape-based gesture recognition is merged 1118 to recognize gesture(s) in the human visual gestures 1102.

Applications of Motion-Assisted Learning Tracking and Enhanced Detection (MATLED)

Figure 12A:
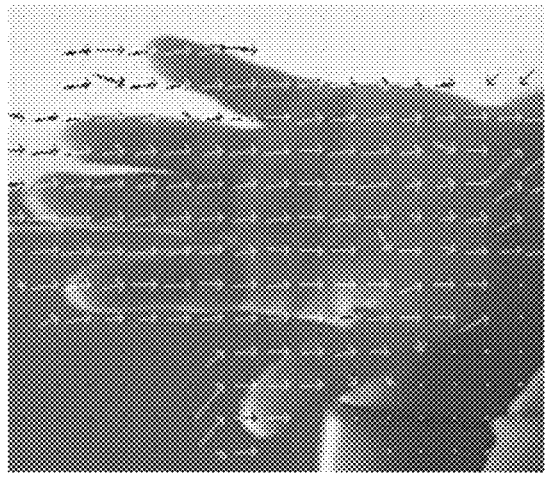
FIG. 12A illustrates an example of recognizing a motion-assisted "Up" hand gesture in accordance with an embodiment of the invention.
Figure 12B:
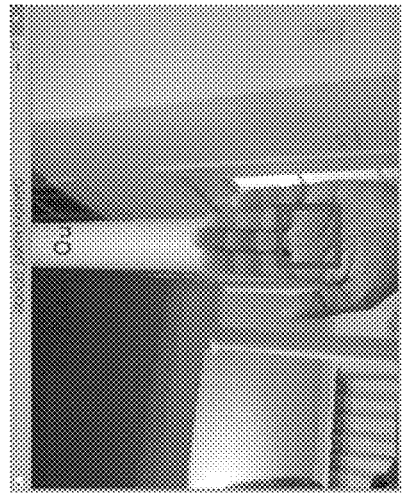
FIG. 12B illustrates an example of recognizing a motion-assisted "Down" hand gesture in accordance with an embodiment of the invention.
Figure 12C:
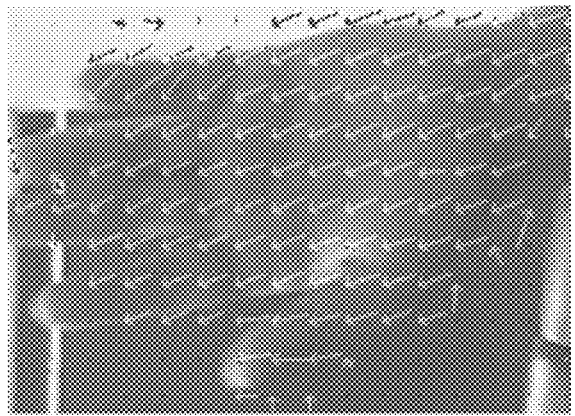
FIG. 12C illustrates an example of recognizing a position-based "Up" gesture in accordance with an embodiment of the invention.
Figure 12D:
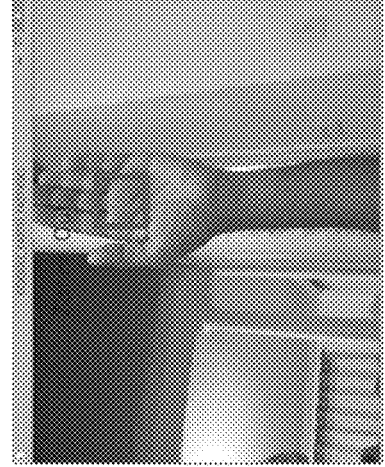
FIG. 12D illustrates an example of recognizing a position-based "Down" gesture in accordance with an embodiment of the invention.

FIG. 12A-FIG. 12D illustrate examples of recognizing motion-assisted gestures positioned by a user hand in accordance with an embodiment of the invention. FIG. 12A shows an example of recognized "Up" gesture and the arrows in the example indicate the upward motion posed by the user hand. Similarly, FIG. 12B shows an example of recognized "Down" gesture and the arrows in the example indicate the downward motion posed by the user hand. The application of the "Up" and "Down" hand gestures recognized based on the motion of the user hand can be used to recognize motions when a user scroll up and down a document or web page displayed on a computer screen. FIG. 12C and FIG. 12D show the corresponding hand gestures of "Up" and "Down", respectively, positioned by a user hand. The rectangles shown in FIG. 12C and FIG. 12D represent the ROIs being detected and tracked by the MATLED module 530 described above.

Figure 13A:
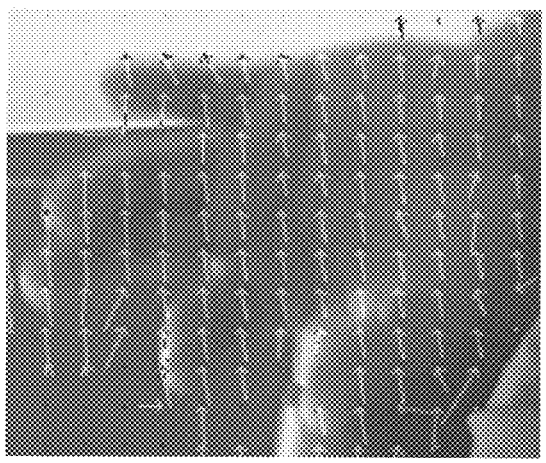
FIG. 13A illustrates an example of recognizing a motion-assisted "Left" hand gesture in accordance with an embodiment of the invention.
Figure 13B:
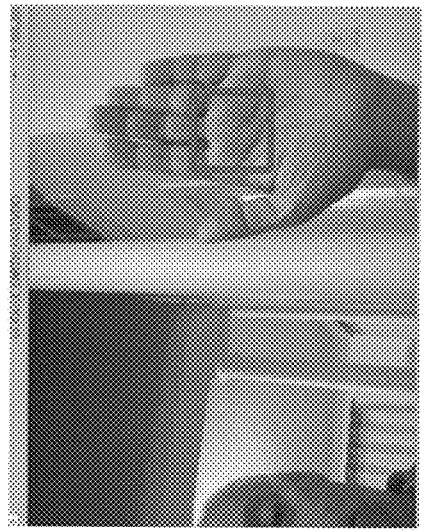
FIG. 13B illustrates an example of recognizing a motion-assisted "Right" hand gesture in accordance with an embodiment of the invention.
Figure 13C:
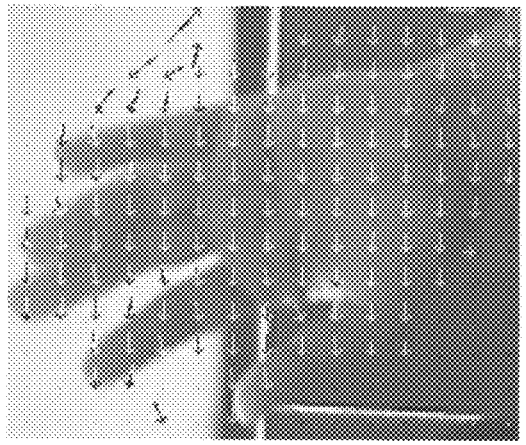
FIG. 13C illustrates an example of recognizing a position-based "Left" gesture in accordance with an embodiment of the invention.
Figure 13D:
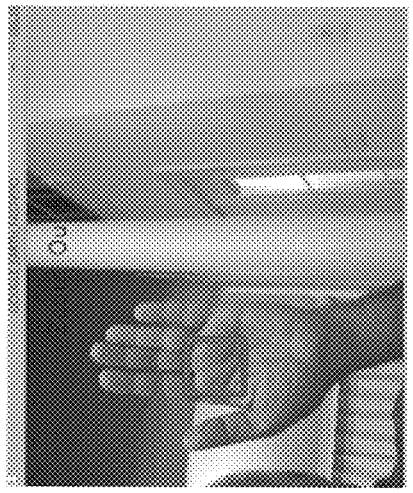
FIG. 13D illustrates an example of recognizing a position-based "Right" gesture in accordance with an embodiment of the invention.

FIG. 13A and FIG. 13B show the examples of recognized "Left" and "Right" gesture, respectively, and the arrows in the examples indicate the left and right direction of the user hand motion. The application of the "Left" and "Right" hand gestures recognized based on the motion of the user hand can be used to recognize motions when a user scroll left and right a document or web page displayed on a computer screen, e.g., turning a page of an electronic book (eBook). Another application of the "Left" and "Right" hand gestures when the "Left" and "Right" motions are performed multiple times by the user hand can be used to express "Hello" or "Goodbye." FIG. 13C and FIG. 13D show the corresponding hand gestures of "Left" and "Right", respectively, positioned by a user hand. The rectangles shown in FIG. 13C and FIG. 13D represent the ROIs being detected and tracked by the MATLED module 530 described above.

Figure 14A:
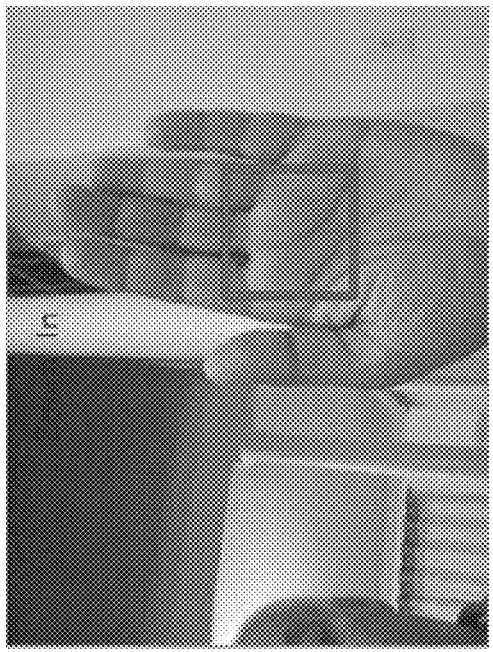
FIG. 14A illustrates an example of recognizing a position-based "In" hand gesture in accordance with an embodiment of the invention.
Figure 14B:
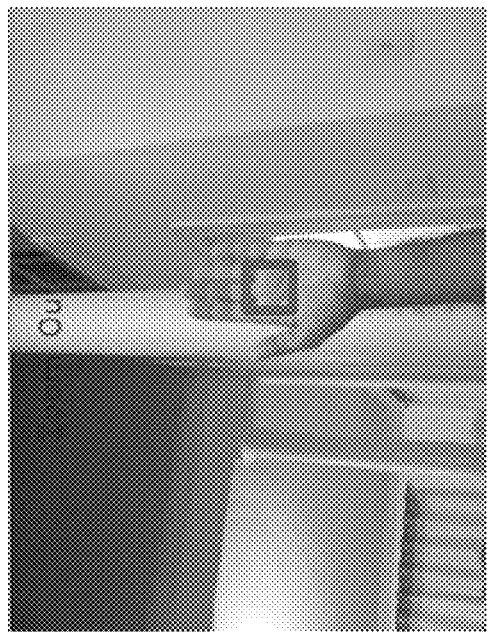
FIG. 14B illustrates an example of recognizing a position-based "Out" hand gesture in accordance with an embodiment of the invention.
Figure 15:
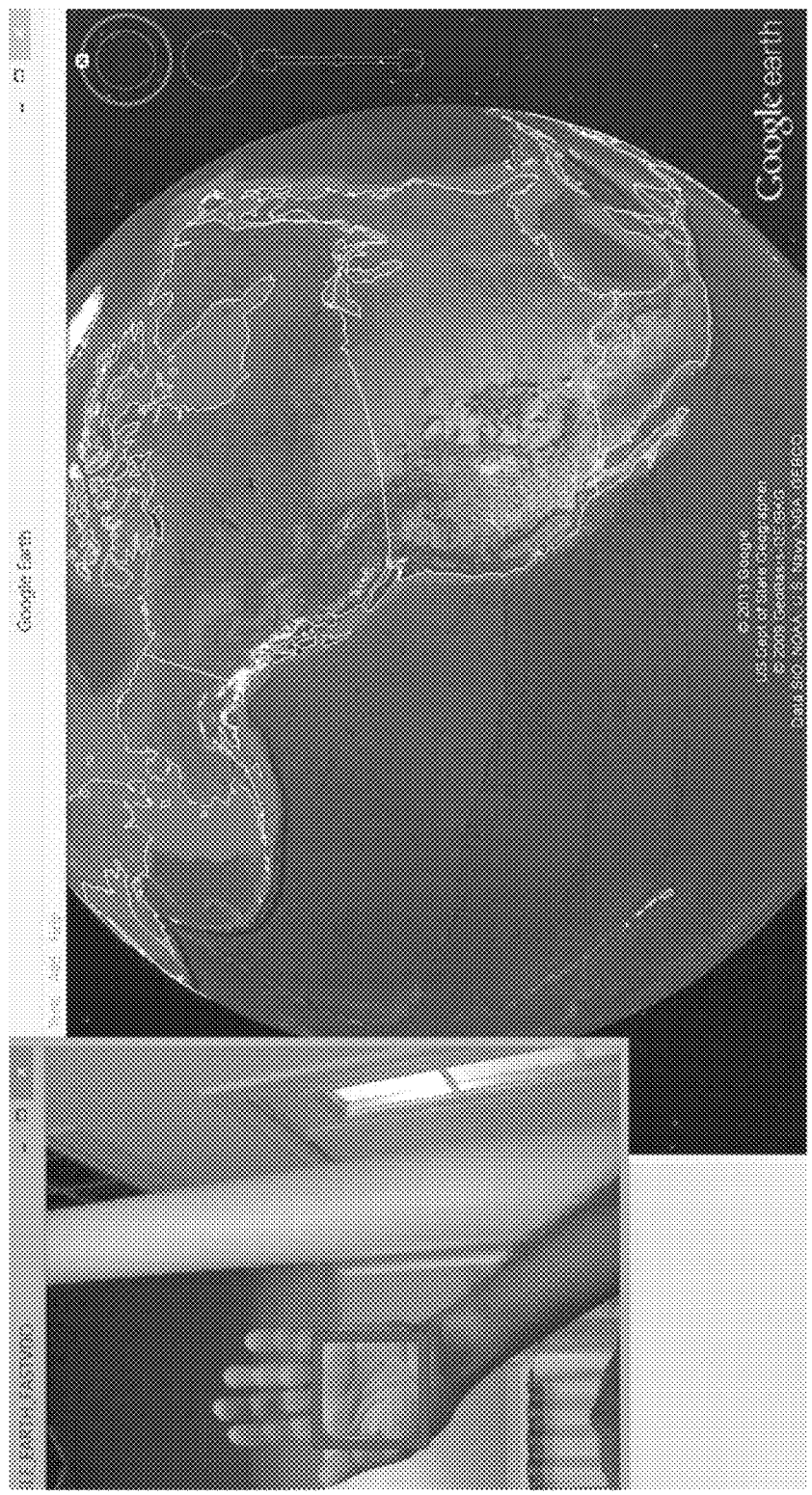
FIG. 15 illustrates an application of the motion-assisted position-based gesture recognition in 3D remote control of Google Earth.

Other applications of the MATLED module 530 include recognition of 3D or multi-dimensional human visual gestures. FIG. 14A and FIG. 14B illustrate two position-based human visual gestures of "In" and "Out," which can be used by the MALTED module 530 to represent depth of a 3D digital image of a human visual gesture. Using the MALTED module 530, conventional 2D video sensors can be used to infer 3D and even multi-dimensional information and relationships of objects contained in the human visual gestures, which, in turn, reduces the complexity of visual gesture recognition with improved system performance. FIG. 15 shows an application of the motion-assisted position-based gesture recognition: 3D remote control of Google Earth.

A Visual Language with Human Visual Gestures

Embodiments of the computer system 100 described above recognize individual human visual gestures, such as hand gesture, facial gesture and body gestures, and translate the recognized human visual gestures into a dictionary, with a known set of recognized human visual gestures as syntax elements, and rules for their synthesis similar to a grammar. One embodiment of the invention is computer based recognition of hand gestures of the American Sign Language. Another embodiment of the invention is computer based recognition of common facial gestures for expressing human emotions such as joy, sorrow, fear, and anger, and in particular recognizing a smile or frown. Another embodiment of the invention develops simple visual codes to express commands to capture, reference, edit, or transmit multimedia messages, which are specifically useful in real-time multimedia applications in a mobile communications environment.

In one embodiment, the computer system 100 is configured to combine multiple human visual gestures to create the visual codes or "visual grammar", which can be used as elaborate and comprehensive commands beyond what a single human visual gesture can communicate. From the visual codes created based on multiple human visual gestures, the computer system 100 is further configured to create specialized shortcuts (also called "shorthand instruction codes"). A multi-gesture code and one or more shortcuts associated with it form a hierarchy, which is useful in terms of usage and the capabilities of transmitting and receiving devices and learning systems using the visual codes.

One application of the multi-gesture visual codes is media editing. Media editing is known to be a complicated process, requiring not only knowledge of image, video and audio feature metadata, such as formats, bitrates, frame rates, etc., but also appropriate selection of audio-video signal processing techniques, e.g., blue screening, layering, fading, blending, etc. Media editing only recently becomes a widely used consumer application with very limited applications in wireless communications environment. Embodiments of the invention provide a solution to media editing using recognized human visual gestures in the mobile communications environment. A further description of embodiments of media editing is provided in U.S. Pat. No. 8,107,599, which is incorporated by reference in its entirety herein.

Figure 16:
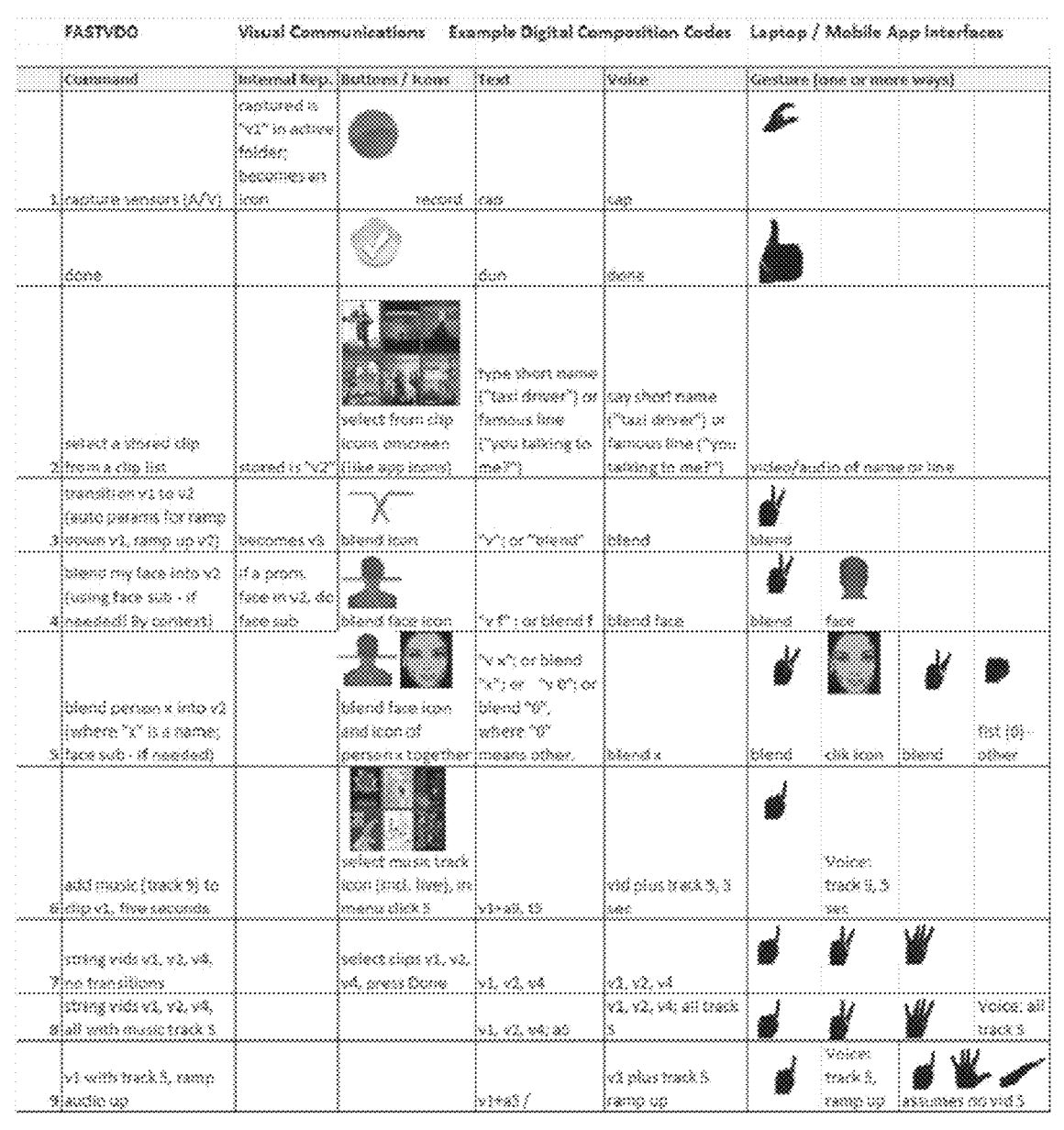

One embodiment of the visual codes includes a limited number of key commands, and provides users an opportunity to invent their own important commands, using their own visual codes (and codes of codes). Specifically, the visual codes include commands to capture, splice, blend, and otherwise manipulate a video. FIG. 16 illustrates a table of example video editing commands and possible indications via the commands. A video editing command can be inputted into a computing device, e.g., a smartphone, by a variety of buttons (e.g., from pull-down menus), text, voice, and/or visual actions. Each video editing command has a corresponding text expression and/or a visual expression, and one or more human visual gestures that form the command.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method for recognizing a visual gesture, the method comprising:
   receiving a visual gesture formed by a part of a human body, the visual gesture being captured in a video having a plurality of video frames;
   determining a region of interest (ROI) in the plurality of video frames of the video based on motion vectors associated with the part of the human body, a centroid of the ROI aligned to be a centroid of a cluster of the motion vectors;
   selecting a visual gesture recognition process based on a user selection of a visual gesture recognition process from a plurality of visual gesture recognition processes;
   applying the selected visual gesture recognition process to the plurality of video frames to recognize the visual gesture;
   determining variations in the centroid, shape, and size of an object within the ROI of the plurality of video frames, the centroid, shape, and size of the object changing according to motion of the object in the plurality of video frames in an affine motion model, wherein said determination of the variations in the centroid, shape and size of the object within the ROI is performed by a track-learning-detection-type (TLD-type) process, wherein the TLD-type process is a signal processing scheme in which following functions are performed simultaneously:
      object tracking, by use of motion estimation in the affine motion model, either using optical flow, or block-based motion estimation and employing estimation error metrics comprising a sum of absolute differences (SAD) and normalized correlation coefficient (NCC);
      object feature learning, which automatically learns features of objects within the ROI, the features including size, centroids, statistics and edges; and
      object detection comprising:
         feature extraction employing edge analysis, spatial transforms, and background subtraction,
         feature analysis employing clustering and vector quantization, and
         feature matching employing signal matching using similarity metrics, neural networks, support vector machines, and maximum posteriori probability; and
   deriving three or more dimensional information and relationships of objects contained in the visual gesture from the plurality of video frames capturing the visual gesture based on the analysis of the variations in the centroid, shape, and size of the object within the ROI.

2. The method of claim 1 wherein the plurality of visual gesture recognition processes include a shaped-based gesture recognition process, a position-based gesture recognition process, a motion-assisted gesture recognition process and a mixed gesture recognition process.

3. The method of claim 1, wherein applying the selected visual gesture recognition process comprises:
   applying a shape-based gesture recognition process to the plurality of the video frames of the visual gesture.

4. The method of claim 3, wherein applying the shape-based gesture recognition process to the plurality of the video frames of the visual gesture comprises:
   selecting a video frame of the plurality of the video frames of the video of the visual gesture as a reference frame, the video frame representing a digital color image of the visual gesture at a time instance;
   applying a general parametric model to the selected video frame of the visual gesture to generate a specific parametric template of the visual gesture;
   subsequently receiving one or more video frames of the video of the visual gesture, wherein the visual gesture in a subsequently received video frame is the visual gesture at a subsequent time instance;
   for each subsequently received video frame, detecting a visual contour of the visual gesture based at least in part on the specific parametric template of the visual gesture; and
   recognizing the visual gesture based at least in part on the detected visual contours.

5. The method of claim 1, wherein applying the selected visual gesture recognition process comprises:
   applying a motion-assisted gesture recognition process to the plurality of the video frames of the visual gesture.

6. The method of claim 5, wherein applying the motion-assisted gesture recognition process to the plurality of the video frames of the visual gesture comprises:
   detecting motion of the object contained in the plurality of video frames capturing the visual gesture, the object being bounded in the ROI of a video frame of the plurality of video frames of the video; and
   recognizing the visual gesture based at least in part on the detected motion of the object.

7. The method of claim 6, further comprising:
   tracking the motion of the object across a subset of the plurality of video frames;
   obtaining estimated motion parameters of the object based on the tracking;
   refining the estimated motion parameters of the object; and
   recognizing the visual gesture based at least in part on the refined estimation of motion parameters of the object.

8. The method of claim 1, wherein applying the visual gesture recognition process comprises:
   applying a position-based gesture recognition process to the plurality of the video frames of the visual gesture, wherein the position-based gesture recognition process uses one of motion-assisted object tracking process, a secondary object tracking process and a mixed process applying the motion-assisted object tracking process and the secondary object tracking process in parallel.

9. The method of claim 8, wherein applying the position-based gesture recognition process to the plurality of the video frames of the visual gesture comprises:

detecting changes of position of the object contained in the plurality of video frames capturing the visual gesture, a change of position of the object representing the visual gesture moving from a previous position to a current position; and recognizing the visual gesture based on the changes of position of the object.

10. The method of claim 1, further comprising:

providing the visual gesture to a computer system having a video sensor; and activating one or more computer commands associated with the computer system using the visual gesture.

11. The method of claim 10, wherein the visual gesture is a detected discrete hand motion, and the detected hand motion is discretized into a small number of directions including Left, Right, Up, and Down, and wherein the detected discrete hand motion is used to indicate a command in a computer application.

12. The method of claim 11, wherein the detected discrete motion is used to indicate a command in navigating an application by moving one step, including moving a step forward or back in a presentation, document, webpage, list, or media gallery.

13. The method of claim 11, wherein a combination of two detected discrete motions in quick succession constitutes another gesture, a Wave hand gesture.

14. The method of claim 11, wherein a special gesture is used to launch or close a computer application.

15. The method of claim 14, wherein the special gesture is comprised of a Wave hand gesture.

16. The method of claim 14, further comprising:

detecting and tracking continuously a subsequent motion or position of the hand responsive to the computer application being launched via a hand gesture, wherein the detected hand motion or position is converted to corresponding motion or position of an on-screen object.

17. The method of claim 16, wherein holding the hand still within a specified tolerance for a specified number of frames is used to indicate readiness to make a selection.

18. The method of claim 10, wherein a special visual gesture is used to indicate selection or deselection in a computer application, including selecting a button, window, object, or link.

19. The method of claim 18, wherein the visual gesture for selection or deselection is comprised of closing an open hand and making a first or opening a fist.

20. The method of claim 18, wherein the visual gesture for selection or deselection is comprised of pointing a finger at a screen or retracting a finger.

21. The method of claim 18, wherein the visual gesture for selection or deselection is comprised of a quick Tap of a hand towards screen or retracting the hand.

22. The method of claim 10, wherein a visual gesture is used in an interactive application.

23. The method of claim 10, wherein a visual gesture corresponds to an action of an on-screen object in a computer application.

24. The method of claim 10, wherein detected hand shapes or figures are interpreted as numbers.

25. The method of claim 10, wherein detected hand shapes or figures are interpreted as letters, words, or phrases, as in a sign language.

26. The method of claim 10, wherein a visual gesture is used to indicate a zoom function in a computer application.

27. The method of claim 26, wherein the visual gesture for zoom indication is comprised of moving a hand smoothly closer to the sensor indicating "zoom in" and moving the hand further away from the sensor indicating "zoom out".

28. The method of claim 10, wherein a special gesture is comprised of a specified shape of a hand including:

a fist;
thumbs up;
thumbs down;
a "V" sign with two fingers up, other fingers closed;
an "O" sign with the hand shaped like a circle; and
a "C" or "U" sign with the hand partly open, thumb parallel to remaining fingers, and pointing up, down, left or right.

29. The method of claim 10, wherein the visual gesture is applied to or in a computer application residing in a computer system of one of following types:

a desktop, laptop, personal computer, printer, copier, or other peripheral;
a tablet, smartphone, wearable computer, or other mobile device;
an embedded computer system, as in a car, train, plane, television or home appliance; and
an enterprise computing system.

30. The method of claim 29, wherein the computer application includes at least one of the following types:

a hardware device application including a keyboard, mouse, camera or other peripheral;
a software application including a presentation, spreadsheet, word processor, browser, media player or media editor;
an art or design application;
a communications application;
an entertainment application or game;
a virtual reality application; and
a health monitoring application.

31. The method of claim 10, wherein the visual gesture is comprised of a current position of a hand relative to an initial or reference position of the hand.

32. The method of claim 10, wherein the visual gesture is comprised of a motion of a hand.

33. The method of claim 10, wherein the visual gesture is comprised of a shape of a hand.

34. The method of claim 10, wherein the visual gesture is comprised of a composite gesture comprising more than one gesture of type position, motion, or shape.

35. The method of claim 10, wherein the visual gesture is composed with two hands.

36. The method of claim 10, wherein the visual gesture is composed using a face, or a part of the face, the part of the face including an eye or both eyes.

37. The method of claim 10, wherein the visual gesture is composed with arms.

38. The method of claim 10, wherein the visual gesture is composed with the human body.

39. The method of claim 1, wherein the visual gesture is a visual code representing one of a plurality of visual gestures and corresponding user input commands.

40. The method of claim 1, further comprising generating a visual code based on one or more user input commands and a plurality of visual gestures.

41. The method of claim 40, wherein the visual code is generated based at least in part on a plurality of predefined visual codes, a plurality of user prerecorded visual codes or a plurality of visual codes created in real time by a user.

42. The method of claim 41, wherein creating the visual codes in real time by the user comprises:

receiving one or more user input commands and a plurality of human visual gestures;

encoding the plurality of human visual gestures into one or more visual codes based on the user input commands; and storing the encoded visual codes in a computer storage medium.

43. The method of claim 42, wherein the user input commands are received using at least one of following:
   tactile input by the user;
   live feed from a camera;
   voice commands;
   hand configurations of the user;
   eye movements of the user;
   handwritings of the user;
   finger or hand movements of the user;
   facial movements of the user; and
   body movements of the user.

44. The method of claim 42, wherein the plurality of the human visual gestures comprise at least one of:
   a plurality of hand gestures;
   a plurality of facial gestures; and
   a plurality of body gestures.

45. A computer-implemented method for recognizing a visual gesture, the method comprising:
   receiving a visual gesture formed by a part of a human body, the visual gesture being captured in a video having a plurality of video frames;
   determining a region of interest (ROI) in the plurality of video frames of the video based on motion vectors associated with the part of the human body, a centroid of the ROI aligned to be a centroid of a cluster of the motion vectors;
   selecting a visual gesture recognition process from a plurality of visual gesture recognition processes based on type of the visual gesture formed by a part of a human body;
   applying the selected visual gesture recognition process to the plurality of video frames to recognize the visual gesture;
   determining variations in the centroid, shape, and size of an object within the ROI of the plurality of video frames, the centroid, shape, and size of the object changing according to motion of the object in the plurality of video frames in an affine motion model, wherein said determination of the variations in the centroid, shape and size of the object within the ROI is performed by a track-learning-detection-type (TLD-type) process, wherein the TLD-type process is a signal processing scheme in which following functions are performed simultaneously:
      object tracking, by use of motion estimation in the affine motion model, either using optical flow, or block-based motion estimation and employing estimation error metrics comprising a sum of absolute differences (SAD) and normalized correlation coefficient (NCC);
      object feature learning, which automatically learns features of objects within the ROI, the features including size, centroids, statistics and edges; and
      object detection comprising:
         feature extraction employing edge analysis, spatial transforms, and background subtraction,
         feature analysis employing clustering and vector quantization, and
         feature matching employing signal matching using similarity metrics, neural networks, support vector machines, and maximum posteriori probability; and deriving three or more dimensional information and relationships of objects contained in the visual gesture from the plurality of video frames capturing the visual gesture based on the determined variations in the centroid, shape, and size of the object within the ROI.

46. The method of claim 45, wherein the plurality of visual gesture recognition processes comprises a shaped-based gesture recognition process, a position-based gesture recognition process, a motion-assisted gesture recognition process and a mixed gesture recognition process.

47. The method of claim 45, further comprising:
   selecting a shape-based visual gesture recognition process; and
   applying the selected shape-based visual gesture recognition process to the plurality of the video frames of the visual gesture.

48. The method of claim 45, further comprising:
   selecting a motion-assisted visual gesture recognition process; and
   applying the selected motion-assisted visual gesture recognition process to the plurality of the video frames of the visual gesture.

49. The method of claim 45, further comprising:
   selecting a position-based visual gesture recognition process; and
   applying the selected position-based visual gesture recognition process to the plurality of the video frames of the visual gesture.

50. The method of claim 45, further comprising:
   selecting a mixed visual gesture recognition process, the mixed visual gesture recognition process comprising two or more gesture recognition processes; and
   applying the selected mixed visual gesture recognition process to the plurality of the video frames of the visual gesture.

51. A computer-implemented method for recognizing a visual gesture, the method comprising:
   receiving a visual gesture formed by a part of a human body, the visual gesture being captured in a video having a plurality of video frames;
   determining a region of interest (ROI) in the plurality of video frames of the video based on motion vectors associated with the part of the human body, a centroid of the ROI aligned to be a centroid of a cluster of the motion vectors;
   applying different visual gesture recognition processes to the plurality of video frames in parallel;
   merging results of the different visual gesture recognition processes to recognize the visual gesture;
   determining variations in the centroid, shape, and size of an object within the ROI of the plurality of video frames, the centroid, shape, and size of the object changing according to motion of the object in the plurality of video frames in an affine motion model, wherein said determination of the variations in the centroid, shape and size of the object within the ROI is performed by a track-learning-detection-type (TLD-type) process, wherein the TLD-type process is a signal processing scheme in which following functions are performed simultaneously:
      object tracking, by use of motion estimation in the affine motion model, either using optical flow, or block-based motion estimation and employing estimation error metrics comprising a sum of absolute differences (SAD) and normalized correlation coefficient (NCC);

object feature learning, which automatically learns features of objects within the ROI, the features including size, centroids, statistics and edges; and object detection comprising:

feature extraction employing edge analysis, spatial transforms, and background subtraction, feature analysis employing clustering and vector quantization, and feature matching employing signal matching using similarity metrics, neural networks, support vector machines, and maximum posteriori probability; and deriving three or more dimensional information and relationships of objects contained in the visual gesture from the plurality of video frames capturing the visual gesture based on the merged results of the different visual gesture recognition processes.

52. The method of claim 51, further comprising:
presenting a plurality of visual gesture recognition types on a computer display.

53. The method of claim 52, wherein the plurality of visual gesture types include a shaped-based gesture, a position-based gesture, a motion-assisted gesture and a mixed gesture.

54. The method of claim 51, wherein a part of the human body forming the visual gesture is at least one of human hand, face and body.

55. The method of claim 51, wherein applying the different visual gesture recognition processes to the plurality of video frames comprises:
applying a shape-based gesture recognition process to the plurality of the video frames of the visual gesture.

56. The method of claim 55, wherein applying the shape-based gesture recognition process to the plurality of the video frames of the visual gesture comprises:
selecting a video frame of the plurality of the video frames of the video of the visual gesture as a reference frame, the video frame representing a digital color image of the visual gesture at a time instance;
applying a general parametric model to the selected video frame of the visual gesture to generate a specific parametric template of the visual gesture;
subsequently receiving one or more video frames of the video of the visual gesture, wherein the visual gesture in a subsequently received video frame is the visual gesture at a subsequent time instance;
for each subsequently received video frame, detecting a visual contour of the visual gesture based at least in part on the specific parametric template of the visual gesture; and
recognizing the visual gesture based at least in part on the detected visual contours.

57. The method of claim 51, wherein applying the different visual gesture recognition processes to the plurality of video frames comprises:
applying a motion-assisted gesture recognition process to the plurality of the video frames of the visual gesture.

58. The method of claim 57, wherein applying the motion-assisted gesture recognition process to the plurality of the video frames of the visual gesture comprises:
detecting motion of the object contained in the plurality of video frames capturing the visual gesture, the object being bounded in the ROI of a video frame of the plurality of video frames of the video; and
recognizing the visual gesture based at least in part on the detected motion of the object.

59. The method of claim 58, further comprising:
tracking the motion of the object across a subset of the plurality of video frames;
obtaining estimated motion parameters of the object based on the tracking;
refining the estimated motion parameters of the object; and
recognizing the visual gesture based at least in part on the detected motion of the object.

60. The method of claim 59, wherein determining motion of the object comprises:
identifying a first instance of the object contained in the ROI in the video frame; and
obtaining a center point position of the ROI and a size of the ROI within the video frames.

61. The method of claim 60, wherein obtaining estimated motion parameters of the object based on the tracking comprises:
clustering the motion vectors representing the tracked motion of the object; and
obtaining one or more estimates of the center point position of the ROI and the size of the ROI based on the clustering of the motion vectors.

62. The method of claim 59, wherein tracking the motion of the object comprises:
obtaining the motion vectors of the object, a motion vector of the object indicating a position of the object in the video frame relative to its corresponding position in a previous or reference video frame of the video.

63. The method of claim 59, wherein refining the estimated motion parameters of the object comprises:
selecting a plurality of candidate ROIs based on a local search centered around estimated position of the ROI;
applying a similarity measure to the plurality of candidate ROIs of the object; and
selecting at least one ROI based on the similarity measure.

64. The method of claim 63, wherein the similarity measure is chosen from a group of sum of absolute difference, mean squared error and normalized correlation coefficient, and the selected ROI optimizes the similarity measure among the plurality of candidate ROIs.

65. The method of claim 63, further comprising adding another video frame as a second reference frame containing an estimated ROI, wherein the estimated ROI has a similarity score exceeding a threshold value.

66. The method of claim 51, wherein applying the different visual gesture recognition processes to the plurality of video frames comprises:
applying a position-based gesture recognition process to the plurality of the video frames of the visual gesture.

67. The method of claim 66, wherein applying the position-based gesture recognition process to the plurality of the video frames of the visual gesture comprises:
detecting changes of position of the object contained in the plurality of video frames capturing the visual gesture, a change of position of the object representing the visual gesture moving from a previous position to a current position; and
recognizing the visual gesture based on the changes of position of the object.

68. The method of claim 67, further comprising:
recording the changes of position of the object;
quantizing the changes of the position of the object; and
recognizing the visual gesture based on quantized changes of position of the object.

69. The method of claim 68, wherein recording the changes of position of the object comprises:

recording a change of position of object by instantaneous position change of the object, wherein the instantaneous position change of the object indicates the change over an immediately previous position of the object.

70. The method of claim 68, wherein recording the changes of position of the object comprises:
   recording a change of position of object by reference position change of the object, wherein the reference position change of the object indicates the change over a pre-defined reference position of the object.

71. The method of claim 68, wherein recording the changes of position of the object further comprises:
   determining at least one characteristic of the visual gesture;
   selecting a method to record the changes of position of the object based on the determined characteristic of the visual gesture; and
   recording the changes of position of the object using the selected method.

72. The method of claim 51, wherein applying the different visual gesture recognition processes comprises:
   applying a motion-assisted object tracking process and a secondary object tracking process in parallel to the plurality of video frames of the visual gesture.

73. The method of claim 72, wherein tracking the object contained in the plurality of video frames capturing the visual gesture by the motion-assisted object tracking process and the secondary object tracking process in parallel comprises:
   obtaining a first set of estimates of a center point position of the ROI containing the object and a size of the ROI based on the object tracking by the motion-assisted object tracking process; and
   obtaining a second set of estimates of the center point position of the ROI containing the object and the size of the ROI based on the object tracking by the secondary object tracking process.

74. The method of claim 73, wherein merging the results of the different visual gesture recognition processes comprises:
   calculating a first confidence score for the motion-assisted object tracking process;
   calculating a second confidence score for the secondary object tracking process; and
   selecting the set of estimates based on comparison of the first confidence score and the second confidence score.

75. The method of claim 73, further comprising:
   allocating computing resource to one tracking process selected from the motion-assisted object tracking process and the secondary object tracking process with a priority higher than the other tracking process; and
   responsive to total computer resource allocated to both the motion-assisted object tracking process and the secondary object tracking process exceeding a predetermined threshold, disabling one of the object tracking processes temporally.

76. The method of claim 73, further comprising:
   responsive to total computer resource exceeding a predetermined threshold, scaling complexity of at least one of the object tracking processes temporally.

77. The method of claim 51, wherein applying the different visual gesture recognition processes to the plurality of video frames comprises:
   analyzing a plurality of features extracted from the plurality of video frames of the visual gesture;
   determining whether to apply a shape-based visual gesture recognition process or a motion-assisted visual gesture recognition process based on the analyzing of the plurality of the features;
   responsive to a determination of applying the shape-based visual gesture recognition process, applying the shape-based visual gesture recognition process to the plurality of the video frames capturing the visual gesture to recognize a shape gesture; and
   responsive to a determination of applying the motion-assisted visual gesture recognition process, applying the motion-assisted visual gesture recognition process to the plurality of the video frames capturing the visual gesture to recognize a motion gesture.

78. A non-transitory computer-readable storage medium storing executable computer program instructions for recognizing a visual gesture, the computer program instructions comprising code for:
   receiving a visual gesture formed by a part of a human body, the visual gesture being captured in a video having a plurality of video frames;
   determining a region of interest (ROI) in the plurality of video frames of the video based on motion vectors associated with the part of the human body, a centroid of the ROI aligned to be a centroid of a cluster of the motion vectors;
   applying different visual gesture recognition processes to the plurality of video frames in parallel;
   merging results of the different visual gesture recognition processes to recognize the visual gesture;
   determining variations in the centroid, shape, and size of an object within the ROI of the plurality of video frames, the centroid, shape, and size of the object changing according to motion of the object in the plurality of video frames in an affine motion model, wherein said determination of the variations in the centroid, shape and size of the object within the ROI is performed by a track-learning-detection-type (TLD-type) process, wherein the TLD-type process is a signal processing scheme in which following functions are performed simultaneously:
      object tracking, by use of motion estimation in the affine motion model, either using optical flow, or block-based motion estimation and employing estimation error metrics comprising a sum of absolute differences (SAD) and normalized correlation coefficient (NCC);
      object feature learning, which automatically learns features of objects within the ROI, the features including size, centroids, statistics and edges; and
      object detection comprising:
         feature extraction employing edge analysis, spatial transforms, and background subtraction,
         feature analysis employing clustering and vector quantization, and
         feature matching employing signal matching using similarity metrics, neural networks, support vector machines, and maximum posteriori probability; and
   deriving three or more dimensional information and relationships of objects contained in the visual gesture from the plurality of video frames capturing the visual gesture based on the merged results of the different visual gesture recognition processes.

79. The computer-readable storage medium of claim 78, further comprising computer program instructions for:

presenting a plurality of visual gesture recognition types on a computer display.

80. The computer-readable storage medium of claim 79, wherein the plurality of visual gesture types include a shaped-based gesture, a position-based gesture, a motion-assisted gesture and a mixed gesture.

81. The computer-readable storage medium of claim 78, wherein a part of the human body forming the visual gesture is at least one of human hand, face and body.

82. The computer-readable storage medium of claim 78, wherein the computer program instructions for applying the different visual gesture recognition processes to the plurality of video frames comprise computer program instructions for:
applying a shape-based gesture recognition process to the plurality of the video frames of the visual gesture.

83. The computer-readable storage medium of claim 82, wherein the computer program instructions for applying the shape-based gesture recognition process to the plurality of the video frames of the visual gesture comprise computer program instructions for:
selecting a video frame of the plurality of the video frames of the video of the visual gesture as a reference frame, the video frame representing a digital color image of the visual gesture at a time instance;
applying a general parametric model to the selected video frame of the visual gesture to generate a specific parametric template of the visual gesture;
subsequently receiving one or more video frames of the video of the visual gesture, wherein the visual gesture in a subsequently received video frame is the visual gesture at a subsequent time instance;
for each subsequently received video frame, detecting a visual contour of the visual gesture based at least in part on the specific parametric template of the visual gesture; and
recognizing the visual gesture based at least in part on the detected visual contours.

84. The computer-readable storage medium of claim 78, wherein the computer program instructions for applying the different visual gesture recognition processes to the plurality of video frames comprise computer program instructions for:
applying a motion-assisted gesture recognition process to the plurality of the video frames of the visual gesture.

85. The computer-readable storage medium of claim 84, wherein the computer program instructions for applying the motion-assisted gesture recognition process to the plurality of the video frames of the visual gesture comprise computer program instructions for:
detecting motion of the object contained in the plurality of video frames capturing the visual gesture, the object being bounded in the ROI of a video frame of the plurality of video frames of the video; and recognizing the visual gesture based at least in part on the detected motion of the object.

86. The computer-readable storage medium of claim 85, further comprising computer program instructions for:
tracking the motion of the object across a subset of the plurality of video frames;
obtaining estimated motion parameters of the object based on the tracking;
refining the estimated motion parameters of the object; and
recognizing the visual gesture based at least in part on the detected motion of the object.

87. The computer-readable storage medium of claim 86, wherein the computer program instructions for determining motion of the object comprise computer program instructions for:
identifying a first instance of the object contained in the ROI in the video frame; and
obtaining a center point position of the ROI and a size of the ROI within the video frames.

88. The computer-readable storage medium of claim 87, wherein the computer program instructions for obtaining estimated motion parameters of the object based on the tracking comprise computer program instructions for:
clustering the motion vectors representing the tracked motion of the object; and
obtaining one or more estimates of the center point position of the ROI and the size of the ROI based on the clustering of the motion vectors.

89. The computer-readable storage medium of claim 86, wherein the computer program instructions for tracking the motion of the object comprise computer program instructions for:
obtaining the motion vectors of the object, a motion vector of the object indicating a position of the object in the video frame relative to its corresponding position in a previous or reference video frame of the video.

90. The computer-readable storage medium of claim 86, wherein the computer program instructions for refining the estimated motion parameters of the object comprise computer program instructions for:
selecting a plurality of candidate ROIs based on a local search centered around estimated position of the ROI;
applying a similarity measure to the plurality of candidate ROIs of the object; and
selecting at least one ROI based on the similarity measure.

91. The computer-readable storage medium of claim 90, wherein the similarity measure is chosen from a group of sum of absolute difference, mean squared error and normalized correlation coefficient, and the selected ROI optimizes the similarity measure among the plurality of candidate ROIs.

92. The computer-readable storage medium of claim 90, further comprising computer program instructions for adding another video frame as a second reference frame containing an estimated ROI, wherein the estimated ROI has a similarity score exceeding a threshold value.

93. The computer-readable storage medium of claim 78, wherein the computer program instructions for applying the different visual gesture recognition processes to the plurality of video frames comprise computer program instructions for:
applying a position-based gesture recognition process to the plurality of the video frames of the visual gesture.

94. The computer-readable storage medium of claim 93, wherein the computer program instructions for applying the position-based gesture recognition process to the plurality of the video frames of the visual gesture comprise computer program instructions for:
detecting changes of position of the object contained in the plurality of video frames capturing the visual gesture, a change of position of the object representing the visual gesture moving from a previous position to a current position; and
recognizing the visual gesture based on the changes of position of the object.

95. The computer-readable storage medium of claim 94, further comprising computer program instructions for:
recording the changes of position of the object;

quantizing the changes of the position of the object; and
recognizing the visual gesture based on quantized changes of position of the object.

96. The computer-readable storage medium of claim 95, wherein the computer program instructions for recording the changes of position of the object comprise computer program instructions for:
  recording a change of position of object by instantaneous position change of the object, wherein the instantaneous position change of the object indicates the change over an immediately previous position of the object.

97. The computer-readable storage medium of claim 95, wherein the computer program instructions for recording the changes of position of the object comprise computer program instructions for:
  recording a change of position of object by reference position change of the object, wherein the reference position change of the object indicates the change over a pre-defined reference position of the object.

98. The computer-readable storage medium of claim 95, wherein the computer program instructions for recording the changes of position of the object further comprise computer program instructions for:
  determining at least one characteristic of the visual gesture;
  selecting a method to record the changes of position of the object based on the determined characteristic of the visual gesture; and
  recording the changes of position of the object using the selected method.

99. The computer-readable storage medium of claim 78, wherein the computer program instructions for applying the different visual gesture recognition processes comprise computer program instructions for:
  applying a motion-assisted object tracking process and a secondary object tracking process in parallel to the plurality of video frames of the visual gesture.

100. The computer-readable storage medium of claim 99, wherein the computer program instructions for tracking the object contained in the plurality of video frames capturing the visual gesture by the motion-assisted object tracking process and the secondary object tracking process in parallel comprise computer program instructions for:
  obtaining a first set of estimates of a center point position of a the ROI containing the object and a size of the ROI based on the object tracking by the motion-assisted object tracking process; and
  obtaining a second set of estimates of the center point position of the ROI containing the object and the size of the ROI based on the object tracking by the secondary object tracking process.

101. The computer-readable storage medium of claim 100, wherein the computer program instructions for merging the results of the different visual gesture recognition processes comprise computer program instructions for:
  calculating a first confidence score for the motion-assisted object tracking process;
  calculating a second confidence score for the secondary object tracking process; and
  selecting the set of estimates based on comparison of the first confidence score and the second confidence score.

102. The computer-readable storage medium of claim 100, further comprising computer program instructions for:
  allocating computing resource to one tracking process selected from the motion-assisted object tracking process and the secondary object tracking process with a priority higher than the other tracking process; and
  responsive to total computer resource allocated to both the motion-assisted object tracking process and the secondary object tracking process exceeding a predetermined threshold, disabling one of the object tracking processes temporally.

103. The computer-readable storage medium of claim 100, further comprising computer program instructions for:
  responsive to total computer resource exceeding a predetermined threshold, scaling complexity of at least one of the object tracking processes temporally.

104. The computer-readable storage medium of claim 78, wherein the computer program instructions for applying the different visual gesture recognition processes to the plurality of video frames comprise computer program instructions for:
  analyzing a plurality of features extracted from the plurality of video frames of the visual gesture;
  determining whether to apply a shape-based visual gesture recognition process or a motion-assisted visual gesture recognition process based on the analyzing of the plurality of the features;
  responsive to a determination of applying the shape-based visual gesture recognition process, applying the shape-based visual gesture recognition process to the plurality of the video frames capturing the visual gesture to recognize a shape gesture; and
  responsive to a determination of applying the motion-assisted visual gesture recognition process, applying the motion-assisted visual gesture recognition process to the plurality of the video frames capturing the visual gesture to recognize a motion gesture.

* * * * *

UNITED STATES PATENT AND TRADEMARK OFFICE
CERTIFICATE OF CORRECTION

Page 1 of 2

PATENT NO. : 9,829,984 B2
APPLICATION NO. : 14/085591
DATED : November 28, 2017
INVENTOR(S) : Wei Dai, Madhu Peringassery Krishnan and Pankaj Topiwala It is certified that error appears in the above-identified patent and that said Letters Patent is hereby corrected as shown below:

On the Title Page

Abstract (57), Lines 4-5, please replace "computer-implement method" with --computer-implemented method--.

Abstract (57), Line 10, please replace "shaped-based gesture" with --shape-based gesture--.

In the Claims

Column 19, Claim 1, Line 46, "in which following functions", please add --the-- to read as --in which the following functions--.

Column 22, Claim 29, Line 15, "one of following types", please add --the-- to read as --one of the following types--.

Column 22, Claim 41, Line 61, "on a plurality predefined", please add --of-- to read as --on a plurality of predefined--.

Column 23, Claim 43, Line 7, "at least one of following", please add --the-- to read as --at least one of the following--.

Column 23, Claim 45, Line 48, "in which following functions", please add --the-- to read as --in which the following functions--.

Column 24, Claim 51, Line 60, "in which following functions", please add --the-- to read as --in which the following functions--.

Column 25, Claim 54, Line 27, "at least one of human", please add --a-- to read as --at least one of a human--.

Signed and Sealed this
Eighth Day of October, 2019

Andrei Iancu
*Director of the United States Patent and Trademark Office*

CERTIFICATE OF CORRECTION (continued)
U.S. Pat. No. 9,829,984 B2

Column 27, Claim 75, Line 50, please replace "allocating computing resource" with --allocating computing resources--.

Column 27, Claim 75, Line 54, please replace "total computer resource" with --total computer resources--.

Column 28, Claim 78, Line 41, "in which following functions", please add --the-- to read as --in which the following functions--.

Column 29, Claim 80, Line 5, please replace "shaped-based gesture" with --shape-based gesture--.

Column 29, Claim 81, Line 9, "at least one of human hand", please add --a-- to read as --at least one of a human hand--.

Column 30, Claim 90, Line 31, "centered around estimated position", please add --an-- to read as --centered around an estimated position--.

Column 31, Claim 100, Line 46, "of a the ROI", please delete "a".

Column 32, Claim 102, Line 15, please replace "allocating computing resource" with --allocating computing resources--.

Column 32, Claim 102, Line 19, please replace "total computer resource" with --total computer resources--.

Column 32, Claim 103, Line 26, please replace "total computer resource" with --total computer resources--.